United States Patent
Tanizawa

(10) Patent No.: US 9,755,826 B2
(45) Date of Patent: Sep. 5, 2017

(54) QUANTUM KEY DISTRIBUTION DEVICE, QUANTUM KEY DISTRIBUTION SYSTEM, AND QUANTUM KEY DISTRIBUTION METHOD

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 134 days.

(21) Appl. No.: 14/919,948

(22) Filed: Oct. 22, 2015

(65) Prior Publication Data
US 2016/0285629 A1    Sep. 29, 2016

(30) Foreign Application Priority Data
Mar. 24, 2015  (JP) .................. 2015-061182

(51) Int. Cl.
H04L 29/06    (2006.01)
H04L 9/08     (2006.01)

(52) U.S. Cl.
CPC .......... H04L 9/0852 (2013.01); H04L 9/0822 (2013.01)

(58) Field of Classification Search
None
See application file for complete search history.

(56) References Cited

U.S. PATENT DOCUMENTS 7,646,873 B2    1/2010  Lee et al.
7,734,757 B2    6/2010  Maeda et al.
(Continued)

FOREIGN PATENT DOCUMENTS

| JP | 5424008 | 2/2014 |
| JP | 2014-53816 | 3/2014 |
| JP | 2015-179989 | 10/2015 |

OTHER PUBLICATIONS

Spiller, Timothy P. Quantum Information Processing: Cryptography, Computation, and Teleportation. Proceedings of the IEEE, vol. 84, Issue: 12. Pub. Date: 1996. http://ieeexplore.ieee.org/stamp/stamp.jsp?arnumber=546399.*

(Continued)

*Primary Examiner* — Jeremiah Avery
(74) *Attorney, Agent, or Firm* — Oblon, McClelland, Maier & Neustadt, L.L.P.

(57) ABSTRACT

According to an embodiment, a quantum key distribution device includes a sharer, a key distillation processor, a first manager, and a second manager. The sharer is configured to share a photon string with the another quantum key distribution device using quantum key distribution via a quantum distribution channel, and obtain a photon bit string corresponding to the photon string. The key distillation processor is configured to generate a link key from the photon bit string. The first manager is configured to store the link key as a link transmission key. The second manager is configured to store, in a storage, a first application key from an application key to be used in cryptographic data communication, encrypt a second application key from the application key, using the link transmission key, and send the encrypted second application key to another quantum key distribution device via a classical communication channel.

11 Claims, 15 Drawing Sheets

(56) References Cited

U.S. PATENT DOCUMENTS

| | | | |
|---|---|---|---|
| 8,050,411 B2* | 11/2011 | Munro | H04L 9/0656 380/279 |
| 9,608,802 B2* | 3/2017 | Yuen | H04L 9/06 |
| 2005/0036624 A1* | 2/2005 | Kent | H04L 9/0858 380/277 |
| 2005/0135620 A1* | 6/2005 | Kastella | H04L 9/12 380/256 |
| 2007/0076871 A1* | 4/2007 | Renes | H04L 9/0858 380/201 |
| 2010/0046755 A1* | 2/2010 | Fiske | H04L 9/0822 380/256 |
| 2012/0177201 A1* | 7/2012 | Ayling | H04L 9/0858 380/278 |
| 2013/0083926 A1* | 4/2013 | Hughes | H04L 9/0836 380/278 |
| 2013/0101121 A1* | 4/2013 | Nordholt | H04L 9/0852 380/279 |
| 2014/0181522 A1 | 6/2014 | Tanizawa et al. | |
| 2015/0222619 A1* | 8/2015 | Hughes | H04L 63/08 713/168 |
| 2015/0271147 A1 | 9/2015 | Tanizawa et al. | |

OTHER PUBLICATIONS

Jiang, Xudong et al. InP-Based Single-Photon Detectors and Geiger-Mode APD Arrays for Quantum Communications Applications. IEEE Journal of Selected Topics in Quantum Electronics, vol. 21, Issue: 3. Pub. Date: 2014. http://ieeexplore.ieee.org/stamp/stamp.jsp?arnumber=6901204.*

Lorunser, Thomas et al. Security Processor with Quantum Key Distribution. International Conference on Application-Specific Systems, Architectures and Processors, ASAP 2008. Pub. Date: 2008. http://ieeexplore.ieee.org/stamp/stamp.jsp?arnumber=4580151.*

O. Maurhart "Applied Quantum Cryptography: Chapter 8: QKD Networks Based on Q3P", vol. 797, 2010, 21 pages.

Mehrdad Dianati et al. "Architecture and Protocols of the Future European Quantum Key Distribution Network", Security and Communications Networks, vol. 1, 2008, 18 pages.

* cited by examiner

QUANTUM KEY DISTRIBUTION DEVICE, QUANTUM KEY DISTRIBUTION SYSTEM, AND QUANTUM KEY DISTRIBUTION METHOD

CROSS-REFERENCE TO RELATED APPLICATION

This application is based upon and claims the benefit of priority from Japanese Patent Application No. 2015-061182, filed on Mar. 24, 2015; the entire contents of which are incorporated herein by reference.

FIELD

Embodiments described herein relate generally to a quantum key distribution device, a quantum key distribution system, and a quantum key distribution method.

BACKGROUND

A quantum key distribution system is configured with a transmitter, a receiver, and an optical fiber link that connects the transmitter and the receiver. The transmitter transmits a string of single photons to the receiver via the optical fiber link (a quantum communication channel) that serves as the communication channel for optical fiber. After that, the transmitter and the receiver exchange control information with each other, and share cryptographic keys. This technology is implemented using the technology generally referred to as quantum key distribution (QKD).

In the quantum key distribution, the photons used for the purpose of sharing cryptographic keys possess quantum uncertainty which is one of the basic principles of quantum mechanics indicating that the photons undergo physical changes when tapped. Due to such a principle, if the photons including the information of a cryptographic key are transmitted from a transmitter and are tapped in the quantum communication channel by a wiretapper, then the photons undergo physical changes thereby enabling the receiver that receives the photons to know that the photons have been tapped by a wiretapper. Hence, if control information is exchanged between the transmitter and the receiver based on the photon string obtained in the transmitter and the photon string detected in the receiver, it becomes possible to eventually obtain a safe cryptographic key.

Each application connected to two nodes (for example, the transmitter and the receiver described above) performs encryption and decryption using a cryptographic key shared between the two nodes, and performs cryptographic data communication according to a cryptographic communication method called the one-time pad method. Each application connected to a plurality of nodes is assumed to be connected to some kind of a safe communication link or is installed in the same housing or the same premises as the corresponding node, and thus can be ensured to be safe as far as the communication with the node is concerned. In order to enable an application in one node and an application in the other node to perform cryptographic data communication at the same timing, the shared cryptographic key needs to be assorted as a transmission key to be used in encryption during transmission and as a reception key to be used in decryption during reception. In the one-time pad method, one byte of data is sent after being encrypted using one byte of the cryptographic key, and the received data is decrypted using the same one byte of the cryptographic key. Moreover, once used, the cryptographic key is destroyed; and a new key is used on a constant basis. In the cryptographic communication using a cryptographic key according to the one-time pad method, it is ensured according to the information theory that no wiretapper having whatever knowledge can decipher the cryptographic communication.

In this way, as the most common method implemented in the operation of sharing cryptographic keys, firstly, there is a link key method in which a key distillation process is performed to generate a cryptographic key from bit information based on a photon string that is a string of single photons shared via a quantum communication channel. The key distillation process includes a sifting process, an error correction process, and a privacy amplification process. A cryptographic key generated as a result of performing the key distillation process is referred to as a link key. In the link key method, encryption and decryption as well as cryptographic data communication is performed using link keys. Herein, as the cryptographic algorithm, the one-time pad method is assumed to be implemented.

A link key needs to be assorted in advance as a transmission key to be used in encryption by the node during transmission and as a reception key to be used in decryption by the node during reception. Regarding the operation of storing a link as a transmission key and a reception key, protocol handling using quantum point-to-point protocol (Q3P) is performed. In Q3P, firstly, processes according to a STORE sub-protocol are performed in which link keys generated as a result of the key distillation process and stored in a plurality of storages called pickup stores are subjected to synchronization control so that identical link keys are selected in the transmitter and the receiver; and the selected link keys are moved at the same timing to a single storage called a common store. Moreover, in Q3P, processes according to a LOAD sub-protocol are performed in which the link keys stored in the common store are assorted in a transmission buffer used to store transmission keys and a reception buffer used to store reception keys.

As another method implemented in the operation of sharing cryptographic keys, the explanation is given for a method called an application key method that is different than the link key method. In the application key method, up to the process of assorting a cryptographic key as a transmission key and a reception key using Q3P, the details are identical to the link key method. One of the two nodes generates random numbers using a random number generator and independent of the already-shared link key, and treats the random numbers as a cryptographic key (called an application key). Then, the same node encrypts the application key using the link keys representing transmission keys and sends the encrypted application key to the other node. Upon receiving the application key, the other node decrypts it using the link keys representing the corresponding reception keys, and stores the original application key. If the node that transmits the application key (the cryptographic key) also attaches the ID of the application key and role information of the application key (i.e., the information enabling distinction of whether the application key is a transmission key or a reception key), it becomes possible to achieve synchronization between the nodes about whether the application key is to be used as a transmission key or as a reception key. Moreover, the application is shared between the nodes only after being encrypted according to the one-time pad method and using the link keys that are generated and shared by means of quantum key distribution. Hence, the application key has an identical safety level to that of the link keys. Meanwhile, the operations including generating random numbers, treating them as a cryptographic key (an application key), encrypting the application key, and sharing the encrypted application key are not limited to only one of the two nodes. Alternatively, each of the two nodes can generate an application key, encrypt it using transmission keys representing link keys, and share the encrypted application key with the other node. A significant advantage of the application key method is that it becomes possible to perform relay and networking of the cryptographic key. Generally, key sharing by means of quantum key distribution is based on the premise of transmission and detection of single photons. Hence, if there is attenuation of the light in the optical fiber, the cryptographic keys can no more be shared. That leads to a physical restriction on the distance between the nodes that can share link keys. The distance is restricted to be equal to or shorter than 100 [km]. On the other hand, if the application key method is implemented, if a node is installed at an intermediate position and if safety of that node is hypothesized, then it becomes possible to break through the restriction on the distance.

However, in the link key method and the application key method, the operation of assorting the link keys according to Q3P requires each node to exchange control data for the purpose of data synchronization and to perform protocol handling. That leads to an increase in the processing delay.

DETAILED DESCRIPTION

According to an embodiment, a quantum key distribution device is connected to another quantum key distribution device by a quantum communication channel and a classical communication channel and that shares a cryptographic key with the another quantum key distribution device. The quantum key distribution device includes a quantum key sharer, a key distillation processor, a first manager, a second manager, and a key manager. The quantum key sharer is configured to share a photon string with the another quantum key distribution device using quantum key distribution via the quantum distribution channel, and obtain a photon bit string corresponding to the photon string. The key distillation processor is configured to generate a link key as the cryptographic key from the photon bit string by a key distillation process. The first manager is configured to store the link key as a link transmission key to be used in data encryption in an internal or external storage. The second manager is configured to store, in the storage, a first application key that has a predetermined role decided therefor from an application key that is the cryptographic key to be used in cryptographic data communication, encrypt a second application key that has a role corresponding to the first application key decided therefor from the application key, using the link transmission key, and send the encrypted second application key to the another quantum key distribution device via the classical communication channel. The key manager is configured to manage the first application key that is stored in the storage for use in encryption or decryption when an application performs data communication.

Exemplary embodiments of a quantum key distribution device, a quantum key distribution system, and a quantum key distribution method according to the invention are described below in detail with reference to the accompanying drawings. Herein, the drawings are only schematic in nature, and the specific configuration should be determined by taking into account the explanation given below.

First Embodiment

Figure 1:
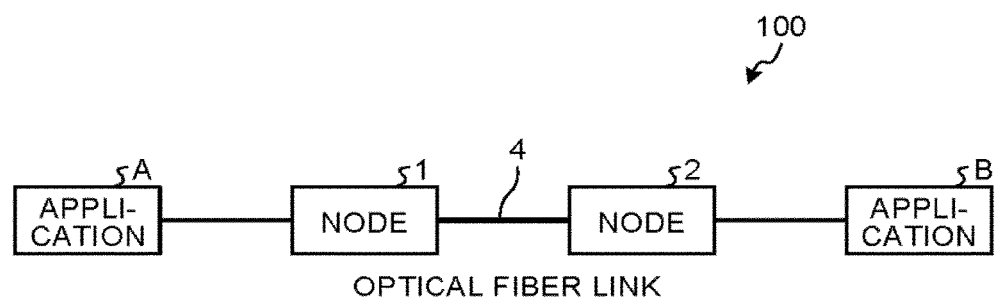
FIG. 1 is a diagram illustrating an exemplary overall configuration of a quantum key distribution system according to a first embodiment.

FIG. 1 is a diagram illustrating an exemplary overall configuration of a quantum key distribution system according to a first embodiment. Thus, explained with reference to FIG. 1 is a configuration of a quantum key distribution system 100.

As illustrated in FIG. 1, the quantum key distribution system 100 includes a node 1 functioning as a transmitter, a node 2 functioning as a receiver, an optical fiber link 4, an application A, and an application B.

The node 1 represents a transmitter (a quantum key distribution device, or a QKD device) that transmits, to the node 2 via the optical fiber link 4, a photon string that is generated using a laser and that is made of single photons which serve as the basis for generating cryptographic keys. Then, the node 1 performs a key distillation process (described later) (i.e., a sifting process, an error correction process, and a privacy amplification process) based on the photon string that is transmitted; and generates a cryptographic key (a link key). During the key distillation process, the node 1 exchanges control data (commonly-used digital data not including single photons; hereinafter referred to as key distillation processing data) with the node 2. Herein, the key distillation processing data may be transferred between the nodes 1 and 2 either via the optical fiber link 4 or using some other communication channel (such as the commonly-used Internet line). The communication channel for digital data that is used for exchanging the key distillation processing data is sometimes called a classical communication channel.

The node 2 represents a receiver (a quantum key distribution device, or a QKD device) that receives, from the node 1 via the optical fiber link 4, a photon string made of single photons which serve as the basis for generating cryptographic keys. Based on the received photon string, the node 2 performs a key distillation process (described later) (i.e., a sifting process, an error correction process, and a privacy amplification process); and generates a cryptographic key (a link key) identical to the cryptographic key generated by the node 1. During the key distillation process, the node 2 exchanges control data (key distillation processing data) with the node 1.

The optical fiber link 4 is an optical fiber cable that serves as the quantum communication channel for transmitting single photons output by the node 1. Meanwhile, although not illustrated in FIG. 1, the transmitter 1 and the receiver 2 are connected not only by the quantum communication channel in the form of the optical fiber link 4 but also by a communication cable (a classical communication channel) that is used in communicating regular digital data of 0s and 1s. The key distillation processing data is exchanged using the classical communication channel.

In the quantum key distribution system 100 including the node 1 and the node 2, in case the photon string sent by the node 1 is tapped by a wiretapper from the optical fiber link 4, the photons undergo physical changes thereby enabling the node 2 that has received the photons to know that the photons have been tapped by a wiretapper.

The application A either represents a function of a device connected to the node 1 via a secure communication link, or represents an application executed in the node 1. The application A receives an application key shared by the node 1 with the node 2; encrypts or decrypts data using that application key; and performs cryptographic data communication with the application B of the node 2.

The application B either represents a function of a device connected to the node 2 via a secure communication link, or represents an application executed in the node 2. The application B receives an application key shared by the node 2 with the node 1; encrypts or decrypts data using that application key; and performs cryptographic data communication with the application A of the node 1.

During such cryptographic data communication, encryption and decryption of data using an application key is done according to the one-time pad method. Herein, consider a case in which the applications A and B perform data encryption and data transmission (perform mutual communication) at the same timing. If the application A as well as the application B uses the same application key for encryption, the application at the receiving side becomes unable to perform decryption using the same application key. As a result, the cryptographic data communication can no more be established. In order to avoid such a situation, the application keys that are generated and shared need to be classified into transmission keys to be used in encryption during transmission and reception keys to be used in decryption during reception. Regarding an operation of classifying the application keys, which are shared between the nodes 1 and 2, into transmission keys and reception keys; the detailed explanation is given later.

Figure 2:
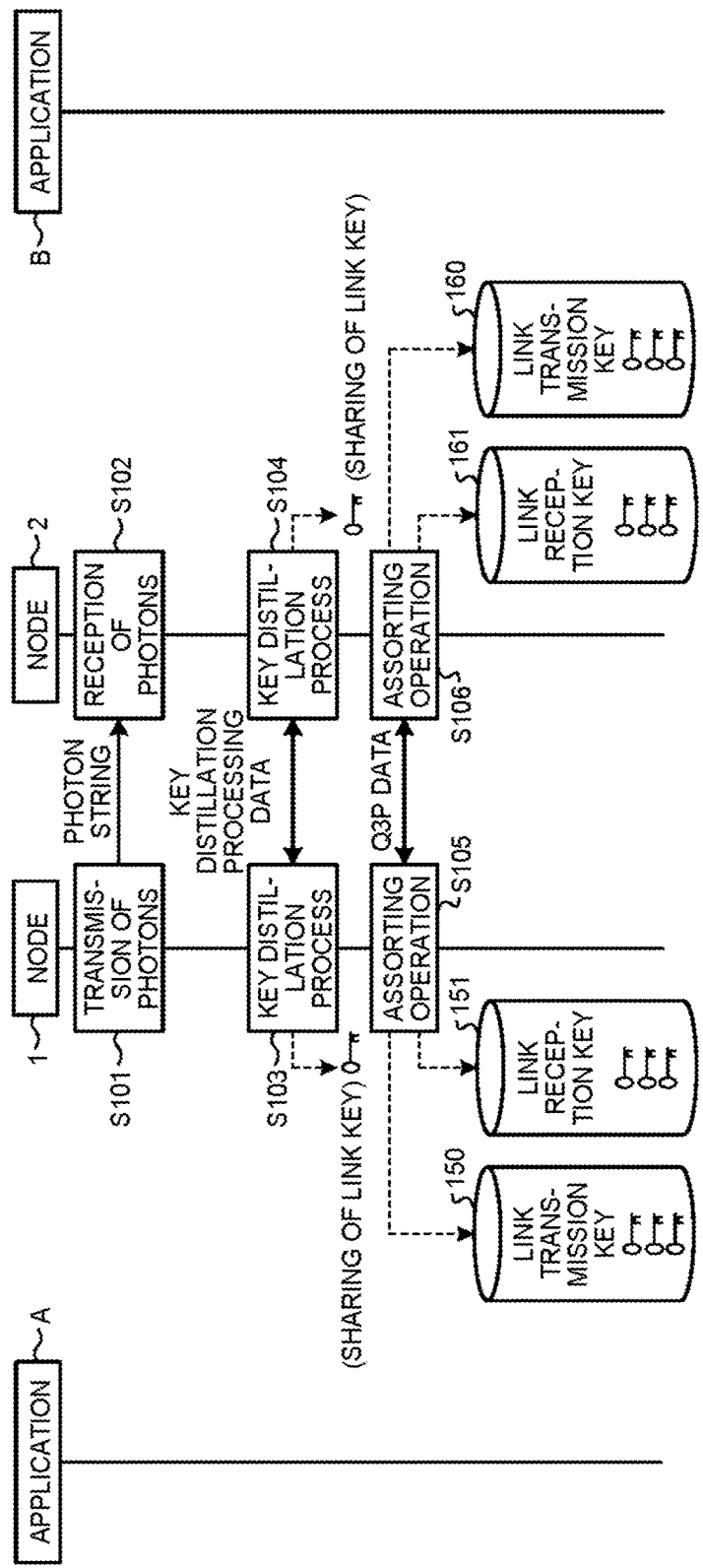
FIG. 2 is a sequence diagram illustrating a commonly-performed link key sharing operation.
Figure 3:
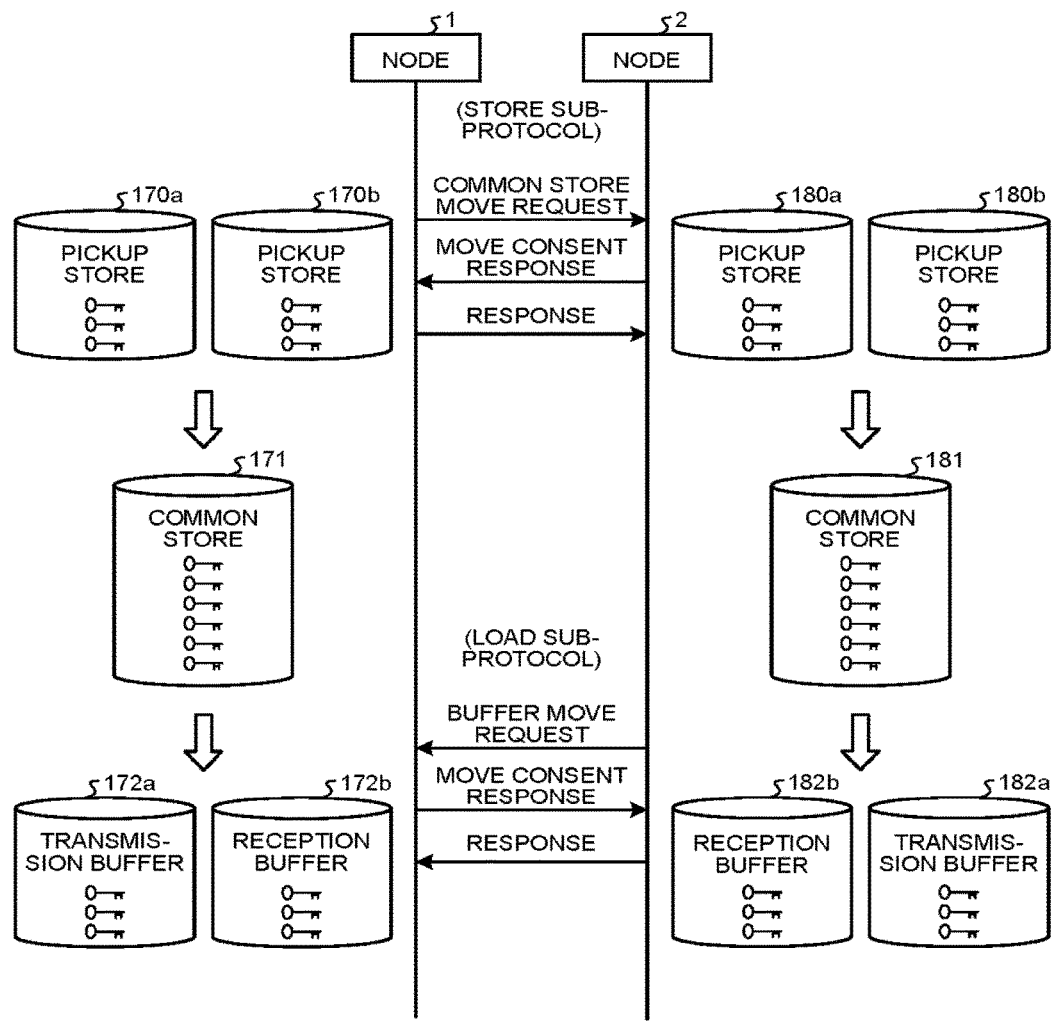
FIG. 3 is a diagram for explaining the operations performed during the protocol handling using quantum point-to-point protocol (Q3P)

FIG. 2 is a sequence diagram illustrating a commonly-performed link key sharing operation. FIG. 3 is a diagram for explaining the operations performed during the protocol handling using Q3P. Firstly, explained with reference to FIG. 2 is the conventional link key sharing operation performed to share link keys between nodes. Herein, the link key sharing operation represents the operation for sharing link keys, which are cryptographic keys, between nodes by means of quantum key distribution.

Step S101

For example, regarding bit information generated using random numbers, the node 1 transmits a photon string made of single photons, which are generated based on base information generated using a randomly-selected base, to the node 2 via the quantum communication channel.

Step S102

The node 2 receives the photon string from the node 1 via the quantum communication channel, and obtains the bit information by reading the received photon string based on base information that is generated using a randomly-selected base.

Step S103

The node 1 communicates control data (key distillation processing data) with the node 2, performs a key distillation process to generate a cryptographic key (a link key) from the bit information, and shares the link key with the node 2. Herein, communication of the key distillation processing data between the nodes 1 and 2 is done via the classical communication channel.

Step S104

The node 2 communicates control data (key distillation processing data) with the node 1, performs a key distillation process to generate a cryptographic key (a link key) from the bit information, and shares the link key with the node 1. Herein, communication of the key distillation processing data between the nodes 1 and 2 is done via the classical communication channel.

Step S105

The node 1 communicates control data (Q3P data) with the node 2, performs the protocol handling using Q3P for the purpose of assorting the generated link keys into transmission keys and reception keys. Herein, communication of the Q3P data between the nodes 1 and 2 is done via the classical communication channel. As illustrated in FIG. 2, as a result of performing the protocol handling using Q3P, a transmission key assorted for the node 1 is referred to as a link transmission key 150; and a reception key assorted for the node 1 is referred to as a link reception key 151.

Step S106

The node 2 communicates control data (Q3P data) with the node 1, and performs the protocol handling using Q3P for the purpose of assorting the generated link keys into transmission keys and reception keys. Herein, communication of the Q3P data between the nodes 1 and 2 is done via the classical communication channel. As illustrated in FIG. 2, as a result of performing protocol handling using Q3P, a transmission key assorted for the node 2 is referred to as a link transmission key 160; and a reception key assorted in the node 2 is referred to as a link reception key 161. Regarding the details of the protocol handling using Q3P, the explanation is given below with reference to FIG. 3.

Explained below with reference to FIG. 3 is the protocol handling using Q3P in the conventional link key sharing operation. Meanwhile, Q3P is assumed to be implementable also in a system having a plurality of optical fiber links (quantum communication channels).

During the protocol handling using Q3P, firstly, the nodes 1 and 2 store the shared links in a plurality of storages called pickup stores. Each pickup store corresponds to one optical fiber link, and is used to store the link keys shared via the concerned optical fiber link. As illustrated in FIG. 3, for example, the node 1 stores link keys in pickup stores 170a and 170b, while the node 2 stores link keys in pickup stores 180a and 180b.

Then, protocol handling using a STORE sub-protocol is performed in which synchronization control is performed so that identical link keys are selected in the nodes 1 and 2, and the selected link keys are moved at the same timing to a single storage called a common store. As illustrated in FIG. 3, the node 1 includes a common store 171, and the node 2 includes a common store 181. Given below is the explanation of the STORE sub-protocol of Q3P.

In Q3P, one of the nodes assumes the role of a master node, and the other node assumes the role of a slave node. Herein, it is assumed that the node 1 represents the master node, and the node 2 represents the slave node. In the STORE sub-protocol, the master node sends to the slave node a common store move request that at least includes the numbers given to the pickup stores and ID information of the link keys. Upon receiving the common store move request from the master node, the slave node sends to the master node a move consent response that identically at least includes the numbers given to the pickup stores and ID information of the link keys. Upon receiving the move consent response from the slave node, the master node sends to the slave node response information (for example, a message such as "Acknowledge") as a response to the move consent response. As a result of such communication, the link keys specified by the ID information are moved by the nodes 1 and 2 to the common store from the pickup stores having the pickup store numbers specified. While moving the link keys; metadata, such as the ID information, and data, such as the key length, that is attached to the link keys stored in the pickup stores is deleted. As a result, a single cryptographic key data stream gets moved to the common store. This sequence of operations represents the operations performed using the STORE sub-protocol.

Then, in the protocol handling using Q3P, the nodes 1 and 2 assigns the cryptographic key data stream (the link keys) to a transmission buffer in which transmission keys are to be stored and a reception buffer in which reception keys are to be stored. As illustrated in FIG. 3, the node 1 includes a transmission buffer 172a and a reception buffer 172b, and the node 2 includes a transmission buffer 182a and a reception buffer 182b. A link key that is stored as a transmission key in the transmission buffer of one node should be stored as a reception key in the reception buffer of the other node. Conversely, a link key that is stored as a reception key in the reception buffer of one node should be stored as a transmission key in the transmission buffer of the other node. In the case of encrypting the data before transmitting it, a node retrieves a transmission key (a link key) from the transmission buffer and makes use of it. Then, the concerned transmission key is deleted from the transmission buffer. In the case of receiving the encrypted data and decrypting it, a node retrieves a reception key (a link key) from the reception buffer and makes use of it. Then, the concerned reception key is deleted from the reception buffer.

Each node monitors the corresponding reception buffer (the reception buffer 172b or the reception buffer 182b). When the number of reception keys stored in the reception buffer decreases, the node replenishes the link keys, which are stored in the common store, as reception keys in the corresponding reception buffer. Moreover, the node controls the partner node to replenish the same link keys, which are stored in the common store, as transmission keys in the corresponding transmission buffer. The protocol implemented at that time is the LOAD sub-protocol. Given below is the explanation of the LOAD sub-protocol in Q3P.

In the LOAD sub-protocol, when the master node attempts to replenish the reception keys, it sends to the slave node a buffer move request that includes information representing the IDs of the link keys, the size of the link keys, and authentication information. Meanwhile, the information about the IDs of the keys is deleted once the keys are stored in the common store. Hence, the master node that implements the LOAD sub-protocol newly generates information representing the IDs of the link keys at the timing of executing the LOAD sub-protocol. Upon receiving the buffer move request from the master node, the slave node moves the keys having the size specified in the buffer move request as the link keys having the specified key IDs from the common store to the transmission buffer as transmission keys, and sends a move consent response including authentication information. Upon receiving a move consent response from the slave node, the master node moves the link keys specified in the information representing the IDs from the common store to the reception buffer as reception keys, and sends to the slave node response information as a response to the move consent response. Meanwhile, when the slave node attempts to replenish the reception keys, it sends to the master node a buffer move request that at least includes the size of the link keys and authentication information. The subsequent operations are identical to the description given above. As a result of following this sequence of operations, the operations according to the LOAD sub-protocols are performed.

As a result of performing the operations explained above, the protocol handling using Q3P is implemented for the purpose of assorting the link keys into transmission keys and reception keys. The protocol handling using Q3P represents a protocol for assorting, between the nodes, the cryptographic keys (link keys) that are already shared between the nodes; and represents a method unique to the key management in quantum key distribution. Moreover, the protocol handling using Q3P has the characteristic that, every time a single cryptographic key is assorted, communication for synchronization control needs to be performed between the node 1 and the node 2, thereby leading to an increase in the processing delay.

Figure 4:
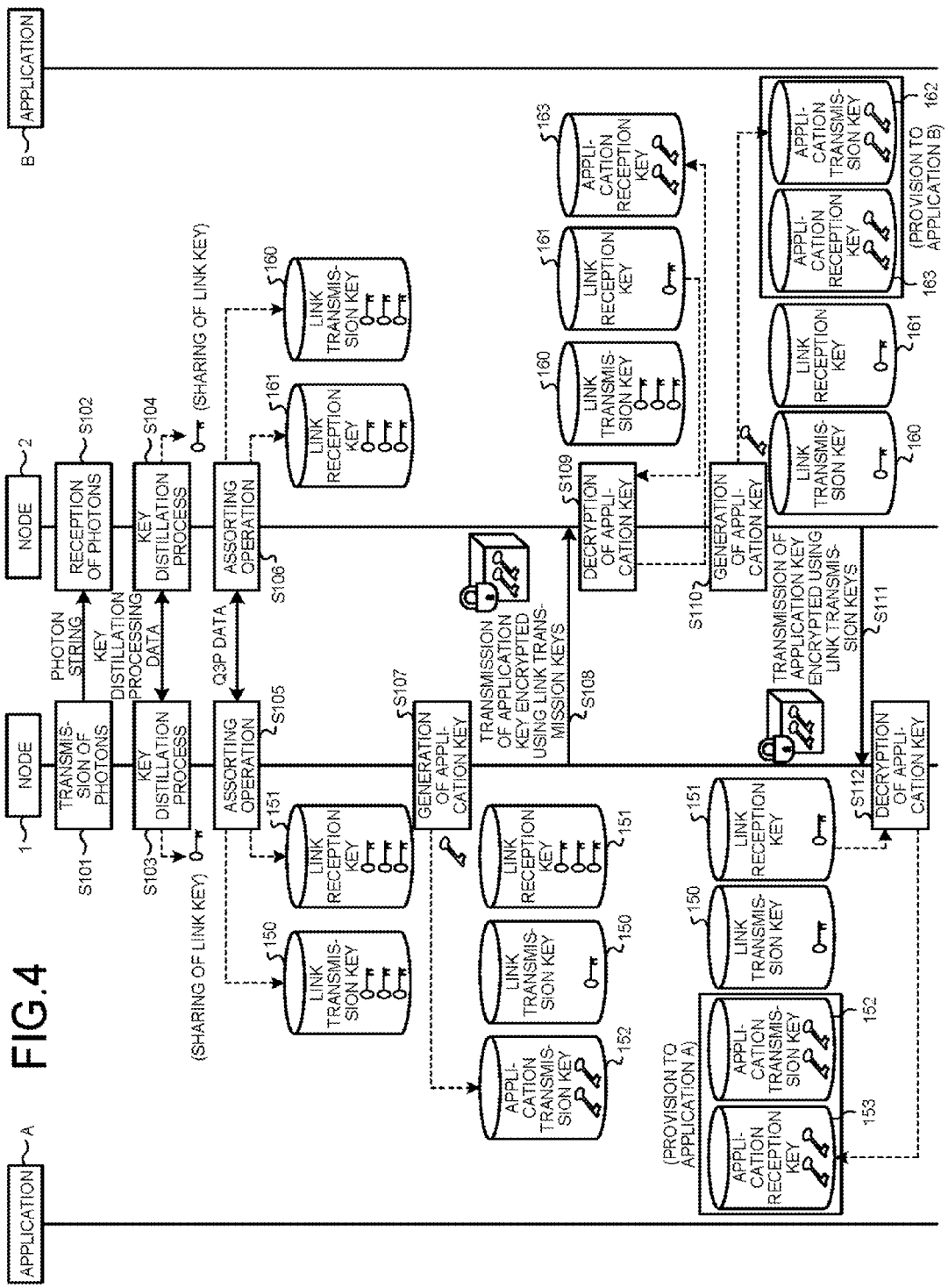
FIG. 4 is a sequence diagram for explaining a commonly-performed application key sharing operation.

FIG. 4 is a sequence diagram for explaining a commonly-performed application key sharing operation. Thus, explained with reference to FIG. 4 is a conventional application key sharing operation performed in order to share application keys between the nodes. Herein, the application key sharing operation includes sharing link keys according to the link key sharing operation described above; performing cryptographic data communication by encrypting and decrypting separately-generated cryptographic keys (application keys) using the link keys; and sharing the application keys between the nodes. In the application key sharing operation, firstly, it is necessary to share link keys between the nodes. The operation for sharing link keys is identical to the link key sharing operation explained with reference to FIGS. 2 and 3.

Steps S101 to S106

The operations are identical to the operations performed at Steps S101 to S106 illustrated in FIG. 2.

Step S107

The node 1 generates, independent of the link keys that have already been shared according to the link key sharing operation, an application key representing is a cryptographic key using random numbers. Then, for example, the node 1 stores, in a storage, the generated application key as a transmission key to be used in encrypting the data to be transmitted by the application A (i.e., as an application transmission key 152 illustrated in FIG. 4). However, storing the generated application key as a transmission key in the storage is not the only possible case. Instead, the node 1 can store the generated application key as a reception key to be used in decrypting the data received by the application A. In that case, at Step S109 described later, it is necessary to achieve synchronization about whether the application key decrypted by the node 2 is to be used as a transmission key or a reception key. The information required to achieve such synchronization represents the information that is attached to the application key generated by the node 1 at Step S108 given below and that enables determination of the role of the application key.

Step S108

The node 1 makes use of the link transmission keys 150 assorted as transmission keys according to the link key sharing operation, encrypts the generated application key according to the one-time pad method, and sends the encrypted application key to the node 2 via the classical communication channel. Herein, the node 1 sends the application key along with the information enabling identification of the application key and the information enabling determination of the role of the application key (for example, the information enabling distinction of whether the application key is a transmission key or a reception key). As a result, it becomes possible to achieve synchronization among the nodes about whether to use the application key as a transmission key or a reception key.

Step S109

Upon receiving the encrypted application key from the node 1, the node 2 makes use of the link reception keys 161 that are assorted as reception keys according to the link key sharing operation; decrypts the application key according to the one-time pad method; and stores, in a storage, the decrypted application key as a reception key to be used in decrypting the data received by the application B (i.e., as an application reception key 163 illustrated in FIG. 4).

Step S110

Meanwhile, encrypting the generated application key using link keys and sending the encrypted application key is not limited to be performed in only one of the nodes (in this example, the node 1). As illustrated in FIG. 4, independent of the link keys that have already been shared according to the link key sharing operation, the node 2 generates an application key that is a cryptographic key using random numbers. Then, for example, the node 2 stores, in a storage, the generated application key as a transmission key to be used in encrypting the data to be transmitted by the application B (i.e., as an application transmission key 162 illustrated in FIG. 4). However, storing the generated application key as a transmission key in the storage is not the only possible case. Instead, the node 2 can store the generated application key as a reception key to be used in decrypting the data received by the application B. In that case, at Step S112 described later, it is necessary to achieve synchronization about whether the application key decrypted by the node 1 is to be used as a transmission key or a reception key. The information required to achieve such synchronization represents the information that is attached to the application key generated by the node 2 at Step S111 given below and that enables determination of the role of the application key.

Step S111

The node 2 makes use of the link transmission keys 160 assorted as transmission keys according to the link key sharing operation, encrypts the generated application key according to the one-time pad method, and sends the encrypted application key to the node 1 via the classical communication channel. Herein, the node 2 sends the application key along with the information enabling identification of the application key and the information enabling determination of the role of the application key (for example, the information enabling distinction of whether the application key is a transmission key or a reception key). As a result, it becomes possible to achieve synchronization among the nodes about whether to use the application key as a transmission key or a reception key.

Step S112

Upon receiving the encrypted application key from the node 2, the node 1 makes use of the link reception keys 151 that are assorted as reception keys according to the link key sharing operation; decrypts the application key according to the one-time pad method; and stores, in a storage, the decrypted application key as a reception key to be used in decrypting the data received by the application A (i.e., as an application reception key 153 illustrated in FIG. 4).

As a result of performing the operations described above, the nodes 1 and 2 can share and use the application keys. An application key is encrypted using the link keys, which are shared according to the link key sharing operation, according to the one-time pad method and is shared between the nodes. Hence, the application keys have an identical safety level to that of the link keys. As far as the advantage of using the application keys is concerned, as described below, if a node is installed for the purpose of relaying the application keys, it becomes possible to break through the restriction on the distance unlike in the case in which only the link keys are used.

Figure 5:
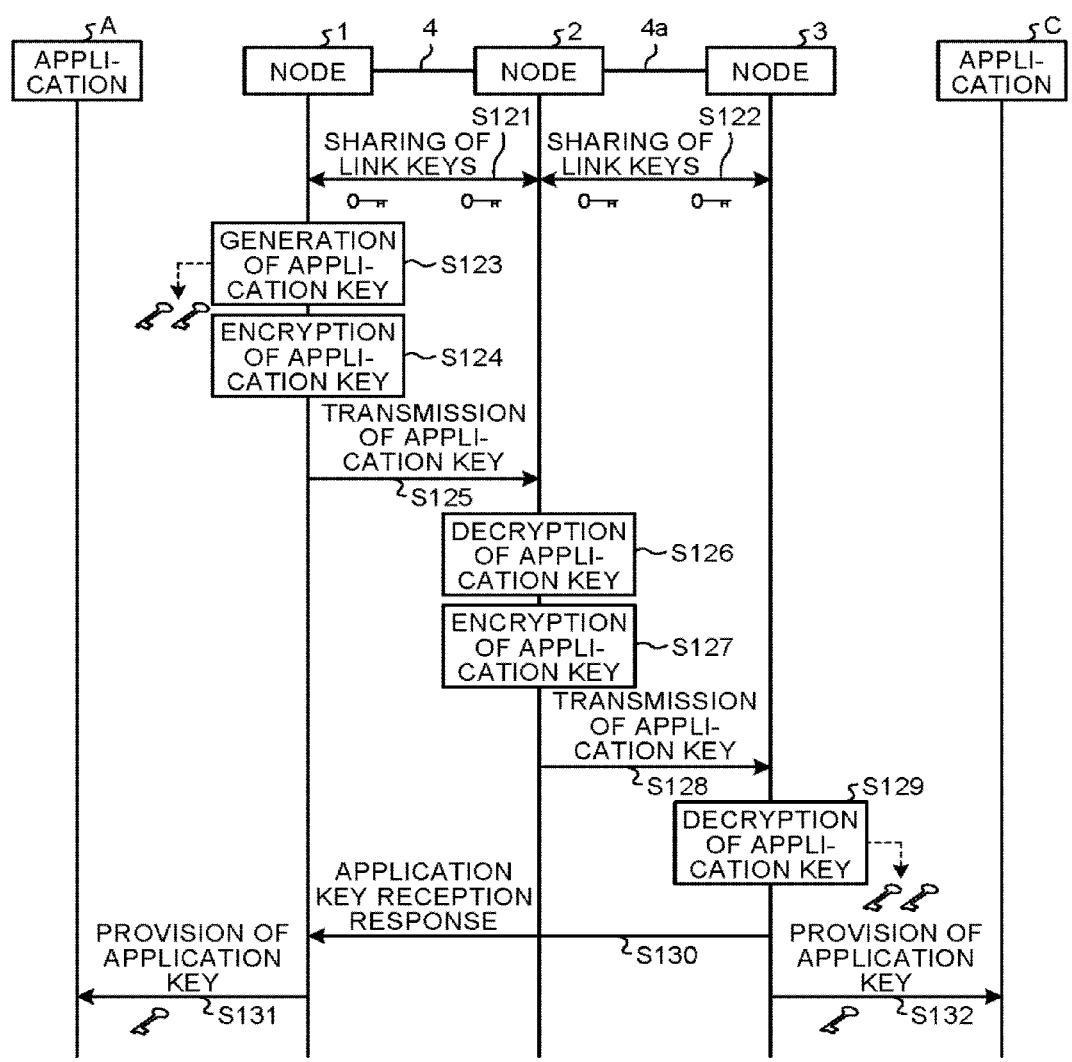
FIG. 5 is a sequence diagram for explaining an example of the application key sharing operation in which the generated cryptographic key is relayed.

FIG. 5 is a sequence diagram for explaining an example of the application key sharing operation in which the generated cryptographic key is relayed. Explained with reference to FIG. 5 are the conventional operations performed by a node to relay an application key.

As illustrated in FIG. 5, consider a quantum key distribution system in which the node 1 is connected to the node 2 by the optical fiber link 4, and the node 2 is further connected to a node 3 by an optical fiber link 4*a*. Moreover, as described above, the application A receives application keys from the node 1, and an application C receives application keys from the node 3.

Steps S121 and S122

The nodes 1 and 2 share link keys according to the link key sharing operation explained with reference to FIG. 2. Similarly, the nodes 2 and 3 share a link key according to the link key sharing operation explained with reference to FIG. 2.

Step S123

Independent of the link keys that have already been shared according to the link key sharing operation, the node 1 generates an application key that is a cryptographic key using random numbers.

Steps S124 and S125

The node 1 encrypts the generated application key according to the one-time pad method and using the transmission keys (the link transmission keys) shared with the node 2 according to the link key sharing operation; and sends the encrypted application key to the node via the classical communication channel.

Steps S126 to S128

Upon receiving the encrypted application key from the node 1, the node 2 decrypts the application key according to the one-time pad method and using the reception keys (the link reception keys) shared with the node 1 according to the link key sharing operation. Moreover, the node 2 encrypts the application key according to the one-time pad method and using the transmission keys (the link transmission keys) shared with the node 3 according to the link key sharing operation; and sends the decrypted application key to the node 3 via the classical communication channel.

Steps S129 and S130

Upon receiving the encrypted application key from the node 2, the node 3 decrypts the application key according to the one-time pad method and using the reception keys (the link reception keys) shared with the node 2 according to the link key sharing operation. Upon decrypting the application key, the node 3 sends an application key reception response, which indicates that the application key is received from the node 1, to the node 1 via the classical communication channel. As a result of performing the processes from Steps S123 to S130, the application key can be shared between the nodes 1 and 3. In this case, the application key can be shared regardless of the fact that the distance between the nodes 1 and 3 does not enable direct quantum key distribution and sharing of the link keys. Moreover, the application key is encrypted using the link keys, which are shared according to the link key sharing operation, according to the one-time pad method and is shared among the nodes. Hence, the application key has an identical safety level to that of the link key.

Steps S131 and S132

The application A receives the application key, which is to be used in encryption and decryption during data communication with the application C, from the node 1. The application C receives the application key, which is to be used in encryption and decryption during data communication with the application A, from the node 3.

In the quantum key distribution system illustrated in FIG. 5, the explanation is given about a case in which three nodes are present. However, that is not the only possible case. Alternatively, there can be four or more nodes, and theoretically the distance can be extended infinitely.

In this way, in the application key sharing operation, it becomes possible to perform relay and networking of cryptographic keys (application keys). The operation of sharing cryptographic keys (link keys) according to the link key sharing operation is performed under the premise that single photons are transmitted and received. Hence, there is a possibility that sharing of the link keys cannot be done due to attenuation in the optical fiber links, and it is possible to think that a physical restriction is developed regarding the distance (for example, equal to or smaller than 100 km) between the nodes that can share the link keys. On the other hand, regarding the operation of sharing the application keys according to the link application key sharing operation, if a node is installed at an intermediate position and if safety of that node is hypothesized, then it becomes possible to break through the restriction on the distance.

Meanwhile, the application key sharing operation is implemented by adding some operations to the link key sharing operation. More particularly, the application key sharing operation is implemented by adding the following operations to the link key sharing operations: generation of an application key by generating random numbers; encryption/decryption of the application key using the link keys according to the one-time pad method; and communication of the encrypted application key. All such operations added to the link key sharing operation for the purpose of implementing the application key sharing operation are commonly-used network protocol technologies having a low processing delay as well as having a sufficiently low development cost and maintenance cost.

Moreover, the application key sharing operation has other advantages that are not available in the link key sharing operation. In the application key sharing operation, the format of the shared cryptographic keys (the application keys) can be determined in an arbitrary manner independent of the internal processing of quantum key distribution. Hence, the cryptographic keys that represent pure random numbers can be shared in a safe manner by including an arbitrary passphrase, an arbitrary certificate, or an arbitrary parameter related to cryptography.

Meanwhile, the application key sharing operation illustrated in FIG. 4 includes the link key sharing operation explained with reference to FIGS. 2 and 3. Hence, as far as the entire application key sharing operation is concerned, the process is long and the processing delay is large. Particularly, the link key sharing operation explained with reference to FIGS. 2 and 3 includes the protocol handling using Q3P, and synchronization control is so performed that identical link keys are selected. Hence, it is necessary to exchange control data and to perform the protocol handling, thereby leading to a large processing delay. Besides, Q3P represents a special protocol used only for sharing link keys in quantum key distribution, and does not have the general versatility to be usable in other technical fields. Hence, the development cost and the maintenance cost also go on increasing. In order to solve the issues of the link key sharing operation explained with reference to FIGS. 2 and 3; a link key sharing operation and an application key sharing operation that do not require the protocol handling using Q3P are implemented in the first embodiment. Given below is the explanation of the quantum key distribution system 100 according to the first embodiment in which a link key sharing operation and an application key sharing operation are implemented without having to perform the protocol handling using Q3P.

Figure 6:
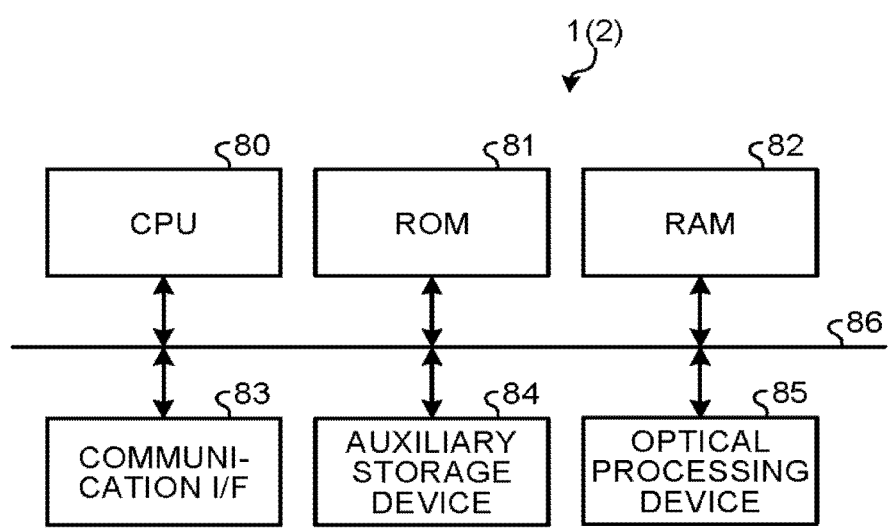
FIG. 6 is a diagram illustrating an exemplary hardware configuration of a node.

FIG. 6 is a diagram illustrating an exemplary hardware configuration of a node according to the first embodiment. Thus, explained with reference to FIG. 6 is a hardware configuration of a node. The following explanation is given for the node 1 as an example.

As illustrated in FIG. 6, the node 1 includes a central processing unit (CPU) 80, a read only memory (ROM) 81, a random access memory (RAM) 82, a communication I/F 83, an auxiliary storage device 84, and an optical processing device 85.

The CPU 80 is a processor that controls the operations o of the entire node 1. The ROM 81 is a nonvolatile storage device used in storing computer programs that are executed by the CPU 80 to control various functions. The RAM 82 is a volatile storage device that serves as the work memory of the CPU 80.

The communication I/F 83 is an interface that enables data communication via a classical communication channel of a network such as a local area network (LAN) or a wireless network. For example, the communication I/F 83 can be an interface compatible to Ethernet (registered trademark) such as 10Base-T, 100Base-TX, or 1000Base-T, or can be an optical fiber.

The auxiliary storage device 84 is a nonvolatile storage device that is used in storing various computer programs executed by the CPU 80 and in storing the data generated during the link key sharing operation and the application key sharing operation. Herein, the auxiliary storage device 84 is a storage device such as a hard disk drive (HDD), a solid state drive (SSD), a flash memory, or an optical disk in which information can be stored in an electrical, magnetic, or optical manner.

The optical processing device 85 is an optical device that transmits and receives photon strings via a quantum communication channel. For example, the optical processing device 85 of the node 1 transmits, to the optical processing device 85 of the node 2 via the quantum communication channel (i.e., via the optical fiber link 4 illustrated in FIG. 1), a photon string that is made of single photons, which are generated to be in a polarization state based on base information generated using a randomly-selected base, based on a bit string (a photon bit string) that represents bit information generated using random numbers. In the photon string generated by the optical processing device 85 of the node 1, each photon holds 1-bit information of either "0" or "1". Thus, the optical processing device 85 of the node 2 receives the photon string from the optical processing device 85 of the node 1 via the quantum communication channel, and obtains a photon bit string representing the bit information by reading the received photon string based on base information generated using a randomly-selected base.

Meanwhile, the CPU 80, the ROM 81, the RAM 82, the communication I/F 83, the auxiliary storage device 84, and the optical processing device 85 are connected to each other in a communicable manner by a bus 86 such as an address bus and a data bus.

Figure 7:
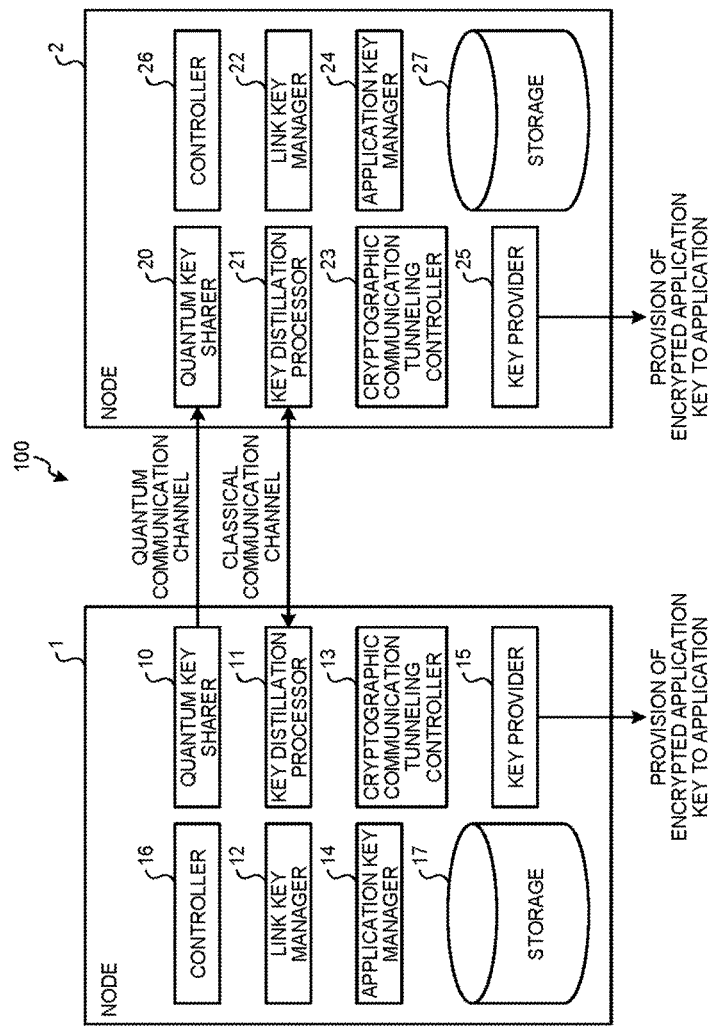
FIG. 7 is a diagram illustrating an exemplary configuration of functional blocks of nodes.

FIG. 7 is a diagram illustrating an exemplary configuration of functional blocks of the nodes according to the first embodiment. Thus, explained with reference to FIG. 7 is a configuration of functional blocks of the nodes 1 and 2.

As illustrated in FIG. 7, the node 1 includes a quantum key sharer 10 (which may be referred to as a first quantum key sharer), a key distillation processor 11 (which may be referred to as a first key distillation processor), a link key manager 12 (which may be referred to as a first manager or a first link-key manager), a cryptographic communication tunneling controller 13, an application key manager 14 (which may be referred to as a second manager or a first application-key manager), a key provider 15 (which may be referred to as a key manager or a first manager), a controller 16, and a storage 17.

The quantum key sharer 10 transmits, to a quantum key sharer 20 of the node 2 via the quantum communication channel (i.e., via the optical fiber link 4 illustrated in FIG. 1), a photon string that is made of single photons, which are generated to be in a polarization state based on base information generated using a randomly-selected base, based on a bit string (a photon bit string) that represents bit information generated using random numbers. The quantum key sharer 10 is implemented using the optical processing device 85 illustrated in FIG. 6.

The key distillation processor 11 communicates key distillation processing data with a key distillation processor 21 of the node 2 via the classical communication channel, and performs a key distillation process for generating cryptographic keys (link keys) from the photon bit string.

The link key manager 12 manages the link keys generated by the key distillation processor 11 by performing the key distillation process. More particularly, the link key manager 12 stores the link keys, which are generated by the key distillation processor 11, in the storage 17.

The cryptographic communication tunneling controller 13 establishes a cryptographic communication channel (hereinafter, referred to as a "cryptographic communication tunnel") in the classical communication channel for the purpose of sending the encrypted data from the node 1 to the node 2 using the link transmission keys stored in the storage 17 by the link key manager 12. This cryptographic communication tunnel can also be used as a one-way communication channel established in the classical communication channel for the purpose of sending the cryptographic keys (the application keys) from the node 1 to the node 2.

The application key manager 14 generates an application key, which is a cryptographic key, using random numbers and independent of the link keys generated by the key distillation processor 11; encrypts the application key using the link transmission keys stored in the storage 17; and sends the encrypted application key to the application key manager 14 of the node 2. Moreover, the application key manager 14 stores, in the storage 17, the generated application key as an application transmission key to be used in encrypting the data to be transmitted by the application A and as an application reception key to be used in decrypting the data received by the application A.

The key provider 15 provides the application transmission key and the application reception key, which are stored in the storage 17, to the application A so as to enable the application A to encrypt and decrypt the data.

The controller 16 controls the operations of the constituent elements of the node 1. Particularly, the controller 16 controls the link key sharing operation performed by the constituent elements of the node 1, and controls the application key sharing operation that includes the link key sharing operation.

The storage 17 is used to store the link keys generated by the key distillation processor 11, and to store the application keys generated by the application key manager 14. The storage 17 is implemented using the auxiliary storage device 84 illustrated in FIG. 6.

Meanwhile, the key distillation processor 11, the link key manager 12, the cryptographic communication tunneling controller 13, the application key manager 14, the key provider 15, and the controller 16 are implemented when the CPU 80 illustrated in FIG. 6 reads computer programs from the auxiliary storage device 84 into the RAM 82 and executes them. However, all of the key distillation processor 11, the link key manager 12, the cryptographic communication tunneling controller 13, the application key manager 14, the key provider 15, and the controller 16 are not limited to be implemented by executing computer programs. Alternatively, at least some of the constituent elements can be implemented using hardware circuitry such as an application specific integrated circuit (ASIC), a field-programmable gate array (FPGA), or some other integrated circuit.

Meanwhile, the key distillation processor 11, the link key manager 12, the cryptographic communication tunneling controller 13, the application key manager 14, the key provider 15, the controller 16, and the storage 17 illustrated in FIG. 7 are meant to illustrate the functions in a conceptual manner. That is, the configuration is not limited to the configuration explained herein. Alternatively, for example, a plurality of independent functional units illustrated in FIG. 7 can be combined as a single functional unit. On the other hand, the function of a single functional unit illustrated in FIG. 7 can be divided into a plurality of functions and can be implemented using a plurality of functional units.

As illustrated in FIG. 7, the node 2 includes the quantum key sharer 20 (which may be referred to as a second quantum key sharer), the key distillation processor 21 (which may be referred to as a second key distillation processor), a link key manager 22 (which may be referred to as the first manager or a second link-key manager), a cryptographic communication tunneling controller 23, an application key manager 24 (which may be referred to as the second manager or a second application-key manager), a key provider 25 (which may be referred to as the key manager or a second key manager), a controller 26, and a storage 27.

The quantum key sharer 20 receives a photon string from the quantum key sharer 10 of the node 1 via the quantum communication channel, and obtains a photon bit string representing bit information by reading the received photon string based on base information that is generated using a randomly-selected base. The quantum key sharer 20 is implemented using the optical processing device 85 illustrated in FIG. 2.

The key distillation processor 21 communicates key distillation processing data with the key distillation processor 11 of the node 1 via the classical communication channel, and performs a key distillation process for generating cryptographic keys (link keys) from the photon bit string.

The link key manager 22 manages the link keys generated by the key distillation processor 21 by performing the key distillation process. More particularly, the link key manager 22 stores the link keys, which are generated by the key distillation processor 21, in the storage 27.

The cryptographic communication tunneling controller 23 establishes a cryptographic communication channel (a cryptographic communication tunnel) in the classical communication channel for the purpose of receiving the data, which is sent from the node 1 to the node 2, using the link reception keys stored in the storage 27 by the link key manager 22. This cryptographic communication tunnel can also be used as a one-way communication channel established in the classical communication channel for the purpose of sending the cryptographic keys (the application keys) from the node 1 to the node 2.

The application key manager 24 decrypts the encrypted application key, which is received from the application key manager 14 via the cryptographic communication tunnel, using the link reception keys stored in the storage 27. Moreover, the application key manager 24 stores, in the storage 27, the decrypted application key as an application transmission key to be used in encrypting the data to be transmitted by the application B and as an application reception key to be used in decrypting the data received by the application B.

The key provider 25 provides the application transmission key and the application reception key, which are stored in the storage 27, to the application B so as to enable the application B to encrypt and decrypt the data.

The controller 26 controls the operations of the constituent elements of the node 2. Particularly, the controller 26 controls the link key sharing operation performed by the constituent elements of the node 2, and controls the application key sharing operation that includes the link key sharing operation.

The storage 27 is used to store the link keys generated by the key distillation processor 21, and to store the application keys generated by the application key manager 24. The storage 27 is implemented using the auxiliary storage device 84 illustrated in FIG. 6.

Meanwhile, the key distillation processor 21, the link key manager 22, the cryptographic communication tunneling controller 23, the application key manager 24, the key provider 25, and the controller 26 are implemented when the CPU 80 illustrated in FIG. 6 reads computer programs stored in the auxiliary storage device 84 into the RAM 82 and executes them. However, all of the key distillation processor 21, the link key manager 22, the cryptographic communication tunneling controller 23, the application key manager 24, the key provider 25, and the controller 26 are not limited to be implemented by executing computer programs. Alternatively, at least some of the constituent elements can be implemented using hardware circuitry such as an ASIC, an FPGA, or some other integrated circuit.

Meanwhile, the key distillation processor 21, the link key manager 22, the cryptographic communication tunneling controller 23, the application key manager 24, the key provider 25, the controller 26, and the storage 27 illustrated in FIG. 7 are meant to illustrate the functions in a conceptual manner. That is, the configuration is not limited to the configuration explained herein. Alternatively, for example, a plurality of independent functional units illustrated in FIG. 7 can be combined as a single functional unit. On the other hand, the function of a single functional unit illustrated in FIG. 7 can be divided into a plurality of functions and can be implemented using a plurality of functional units.

In the first embodiment, the link key sharing operation includes transmission and reception of a photon string by the quantum key sharers 10 and 20, generation of link keys by the key distillation processors 11 and 21 by performing the key distilling operation, and storing of the link keys by the link key managers 12 and 22. Moreover, of the application key sharing operation according to the first embodiment, the operations other than the link key sharing operation, that is, the operations for sharing the application keys are performed by the application key managers 14 and 24.

Figure 8:
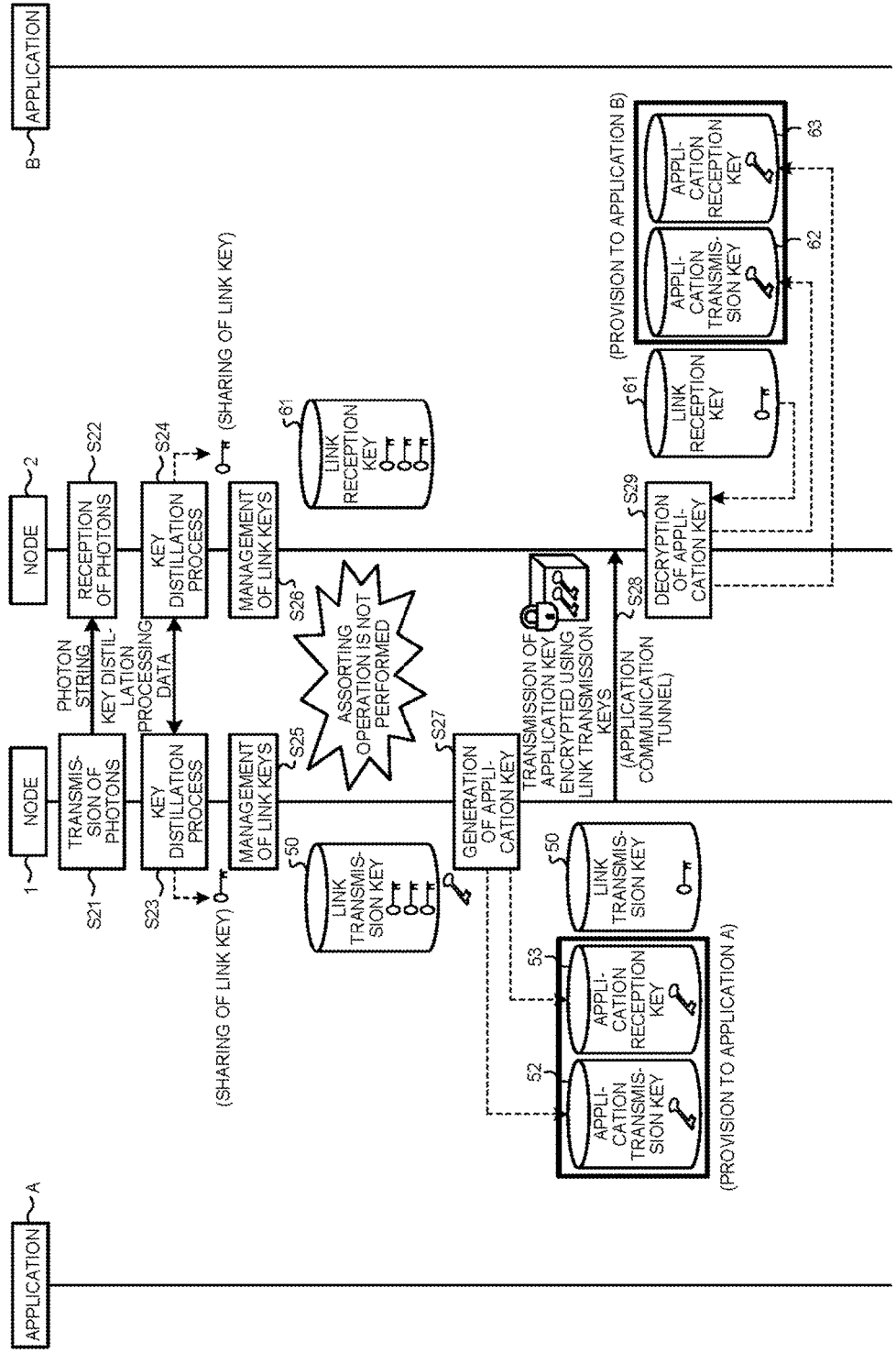
FIG. 8 is a sequence diagram for explaining the application key sharing operation according to the first embodiment.

FIG. 8 is a sequence diagram for explaining the application key sharing operation according to the first embodiment. Thus, explained with reference to FIG. 8 is the application key sharing operation according to the first embodiment.

Step S21

For example, the quantum key sharer 10 of the node 1 transmits, to the quantum key sharer 20 of the node 2 via the quantum communication channel, a photon string that is made of single photons, which are generated to be in a polarization state based on base information generated using a randomly-selected base, based on a bit string (a photon bit string) that represents bit information generated using random numbers.

Step S22

The quantum key sharer 20 of the node 2 receives the photon string from the quantum key sharer 10 via the quantum communication channel, and obtains a photon bit string by reading the received photon string based on base information that is generated using a randomly-selected base.

Step S23

The key distillation processor 11 of the node 1 communicates key distillation processing data with the key distillation processor 21 of the node 2 via the classical communication channel, and performs a key distillation process for generating cryptographic keys (link keys) from the photon bit string.

Step S24

The key distillation processor 21 of the node 2 communicates key distillation processing data with the key distillation processor 11 of the node 1 via the classical communication channel, and performs a key distillation process for generating cryptographic keys (link keys) from the photon bit string.

Step S25

The link key manager 12 of the node 1 stores, in the storage 17, the link keys, which are generated by the key distillation processor 11 by performing the key distillation process, as link transmission keys 50 to be used in encrypting the application keys generated by the application key manager 14.

Step S26

The link key manager 22 of the node 2 stores, in the storage 27, the link keys, which are generated by the key distillation processor 21 by performing the key distillation process, as link reception keys 61 to be used in decrypting the application key generated by the application key manager 24.

As a result of performing the operations from Steps S21 to S26, the link key sharing operation according to the first embodiment gets implemented. Thus, the link keys generated by the key distillation processors 11 and 21 are not assorted according to the protocol handling using Q3P but are stored in a specialized form as link transmission keys and link reception keys, respectively. That is, a link key generated by the key distillation processor 11 is used only as a link transmission key for the purpose of encrypting an application key transmitted to the node 2; while a link key generated by the key distillation processor 21 is used only as a link reception key for the purpose of decrypting an application key received from the node 1.

Step S27

The application key manager 14 of the node 1 generates an application key, which is a cryptographic key, using random numbers and independent of the link keys generated by the key distillation processor 11. Then, the application key manager 14 stores, in the storage 17, the generated application key as an application transmission key 52 (an example of a first application key) to be used in encrypting the data to be transmitted by the application A and as an application reception key 53 (an example of a first application key) to be used in decrypting the data received by the application A.

Step S28

The application key manager 14 encrypts the generated application key using the link transmission keys 50 assorted as transmission keys according to the link key sharing operation; and sends the encrypted application key to the application key manager 24 of the node 2 via the cryptographic communication tunnel. In this way, the application key generated by the application key manager 14 is sent to the node 2 using one-way communication via the cryptographic communication tunnel. Moreover, the application key manager 14 sends the application key along with the information enabling identification of the application key and the information enabling determination of the role of the application key (for example, the information enabling distinction of whether the application key is a transmission key or a reception key). As a result, it becomes possible to achieve synchronization among the nodes about whether to use the application key as a transmission key or a reception key. Meanwhile, the information enabling identification of the application key and the information enabling determination of the role of the application key can also be encrypted in an identical manner to the encryption of the application key. Alternatively, instead of encrypting the information, only data authentication can be performed.

Step S29

When the encrypted application key is received from the application key manager 14 of the node 1, the application key manager 24 of the node 2 decrypts the application key using the link reception keys 61 assorted as reception keys according to the link key sharing operation. Moreover, according to the information attached to the application key for enabling determination of the role of the application key, the application key manager 24 stores, in the storage 27, the decrypted application key as an application transmission key 62 (an example of a second application key) to be used in encrypting the data to be transmitted by the application B and as an application reception key 63 (an example of a second application key) to be used in decrypting the data received by the application B.

As a result of performing the operations described above, the application key sharing operation according to the first embodiment is performed, and the application key is shared between the nodes 1 and 2.

In this way, in the quantum key distribution system 100 according to the first embodiment, a link key generated by the key distillation processor 11 is used only as a link transmission key for the purpose of encrypting the application key to be transmitted to the node 2; while a link key generated by the key distillation processor 21 is used only as a link reception key for the purpose of decrypting the application key received from the node 1. Moreover, the application key manager 14 of the node 1 generates, as application keys, the application transmission key 52 to be used in encrypting the data to be transmitted by the application A (regarding the application B, the application reception key 63 to be used in decrypting the data received by the application B), and the application reception key 53 to be used in decrypting the data received by the application A (regarding the application B, the application transmission key 62 to be used in encrypting the data to be transmitted by the application B). As a result, without having to perform the protocol handling using Q3P, the nodes 1 and 2 can share the application keys (the application transmission key and the application reception key); and the applications A and B can perform cryptographic data communication according to the one-time pad method using the shared application keys. In this way, there is no need to perform the protocol handling using Q3P for the purpose of sharing application keys, thereby enabling achieving reduction in the processing delay during the operations of sharing cryptographic keys (link keys and application keys).

Meanwhile, in the example illustrated in FIG. 8, the cryptographic communication tunnel is assumed to be a one-way communication channel used in transmitting application keys from the node 1 to the node 2. However, that is not the only possible case. Alternatively, the cryptographic communication tunnel can be used as a one-way communication channel for transmitting application keys from the node 2 to the node 1. In that case, a link key generated in the node 1 can be stored as a link reception key, while a link key generated in the node 2 can be stored as a link transmission key.

Modification Example

Regarding the application key sharing operation according to a modification example, the explanation is given with the focus on the differences with the application key sharing operation explained with reference to FIG. 8. In the first embodiment, two types of cryptographic keys, namely, an application transmission key and an application reception key used by a single pair of applications (the applications A and B) are shared. In the modification example, the explanation is given about the application key sharing operation performed in the nodes 1 and 2 in the case in which a plurality of pairs of applications is running.

Figure 9:
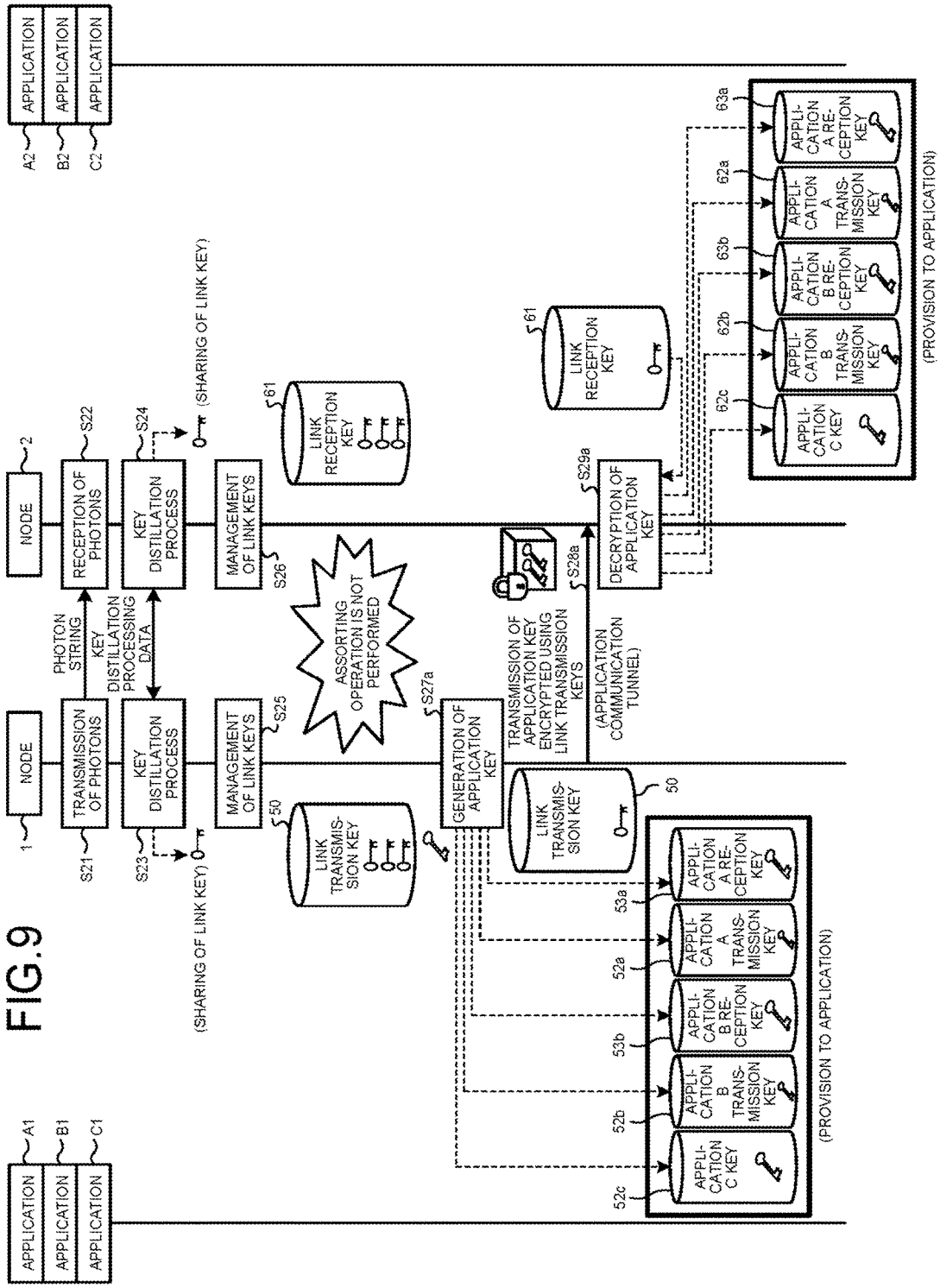
FIG. 9 is a sequence diagram for explaining the application key sharing operation according to a modification example of the first embodiment.

FIG. 9 is a sequence diagram for explaining the application key sharing operation according to the modification example of the first embodiment. Thus, explained with reference to FIG. 9 is the application key sharing operation according to the modification example.

As illustrated in FIG. 1, it is assumed that applications A1, B1, and C1 are running as the applications connected to or executed in the node 1. Similarly, it is assumed that applications A2, B2, and C2 are running as the applications connected to or executed in the node 2. The application A1 of the node 1 performs cryptographic data communication with the application A2 according to the one-time pad method. At the time of transmitting data to the other application, both the applications A1 and A2 require an application transmission key for encrypting the data. Similarly, at the time of receiving data from the other application, both the applications A1 and A2 require an application reception key for decrypting the data. The application B1 of the node 1 performs cryptographic data communication with the application B2 according to the one-time pad method. At the time of transmitting data to the other application, both the applications B1 and B2 require an application transmission key for encrypting the data. Similarly, at the time of receiving data from the other application, both the applications B1 and B2 require an application reception key for decrypting the data. The application C1 of the node 1 performs cryptographic data communication with the application C2 using, for example, the advance encryption standard (AES) in which an application need not distinguish between transmission keys and reception keys while performing transmission and reception. In the case in which the applications C1 and C2 perform cryptographic data communication without using transmission keys and reception keys, the application key that is required is referred to as an "application C key".

Steps S21 to S26

The operations are identical to the link key sharing operation performed at Steps S21 to S26 illustrated in FIG. 8.

Step S27*a*

The application key manager 14 of the node 1 generates an application key, which is a cryptographic key, using random numbers and independent of the link keys generated by the key distillation processor 11. Then, the application key manager 14 stores, in the storage 17, the generated application key as follows: an application A transmission key 52*a* (an example of a first application key) to be used in encrypting the data to be transmitted by the application A1; an application A reception key 53*a* (an example of a first application key) to be used in decrypting the data received by the application A1; an application B transmission key 52*b* (an example of a first application key) to be used in encrypting the data to be transmitted by the application B1; an application B reception key 53*b* (an example of a first application key) to be used in decrypting the data received by the application B1; and an application C key 52*c* (an example of a first application key) to be used in encrypting the data to be transmitted by the application C1 and in decrypting the data received by the application C1.

Step S28*a*

The application key manager 14 encrypts the generated application key using the link transmission keys 50 assorted as transmission keys according to the link key sharing operation; and sends the encrypted application key to the application key manager 24 of the node 2 via the cryptographic communication tunnel. Moreover, the application key manager 14 sends the application key along with the information enabling identification of the application key and the information enabling determination of the role of the application key (for example, the information about the applications in which the application key is to be used and the information enabling distinction of whether the application key is a transmission key or a reception key). As a result, it becomes possible to achieve synchronization among the nodes about the applications in which the application key is to be used and about whether to use the application key as a transmission key or a reception key. Meanwhile, the information enabling identification of the application key and the information enabling determination of the role of the application key can also be encrypted in an identical manner to the encryption of the application key. Alternatively, instead of encrypting the information, only data authentication can be performed.

Step S29*a*

When the encrypted application key is received from the application key manager 14 of the node 1, the application key manager 24 of the node 2 decrypts the application key using the link reception keys 61 assorted as reception keys according to the link key sharing operation. Moreover, according to the information attached to the application key for enabling determination of the role of the application key, the application key manager 24 stores, in the storage 27, the decrypted application key as follows: an application A transmission key 62*a* (an example of a second application key) to be used in encrypting the data to be transmitted by the application A2; an application A reception key 63*a* (an example of a second application key) to be used in decrypting the data received by the application A2; an application B transmission key 62*b* (an example of a second application key) to be used in encrypting the data to be transmitted by the application B2; an application B reception key 63B (an example of a second application key) to be used in decrypting the data received by the application B2; and an application C key 62*c* (an example of a second application key) to be used in encrypting the data to be transmitted by the application C2 and in decrypting the data received by the application C2.

As described above, even in the case in which a plurality of applications is running among the nodes, three or more types of roles are assigned to an application key so that the application key can be provided to a plurality of applications while achieving reduction in the processing delay in the operation of sharing the cryptographic keys (the link keys and the application keys).

Meanwhile, depending on the applications, there are times when only one-way communication is performed in the first place. In that case, an application transmission key can be assigned to the application that transmits data, while an application reception key can be assigned to the application that receives data.

Second Embodiment

Regarding the application key sharing operation according to a second embodiment, the explanation is given with the focus on the differences with the application key sharing operation explained with reference to FIG. 8. In the first embodiment, only an application key is provided as the cryptographic key to the applications. In contrast, in the second embodiment, an application key and a link key are provided as the cryptographic keys to the applications.

Figure 10:
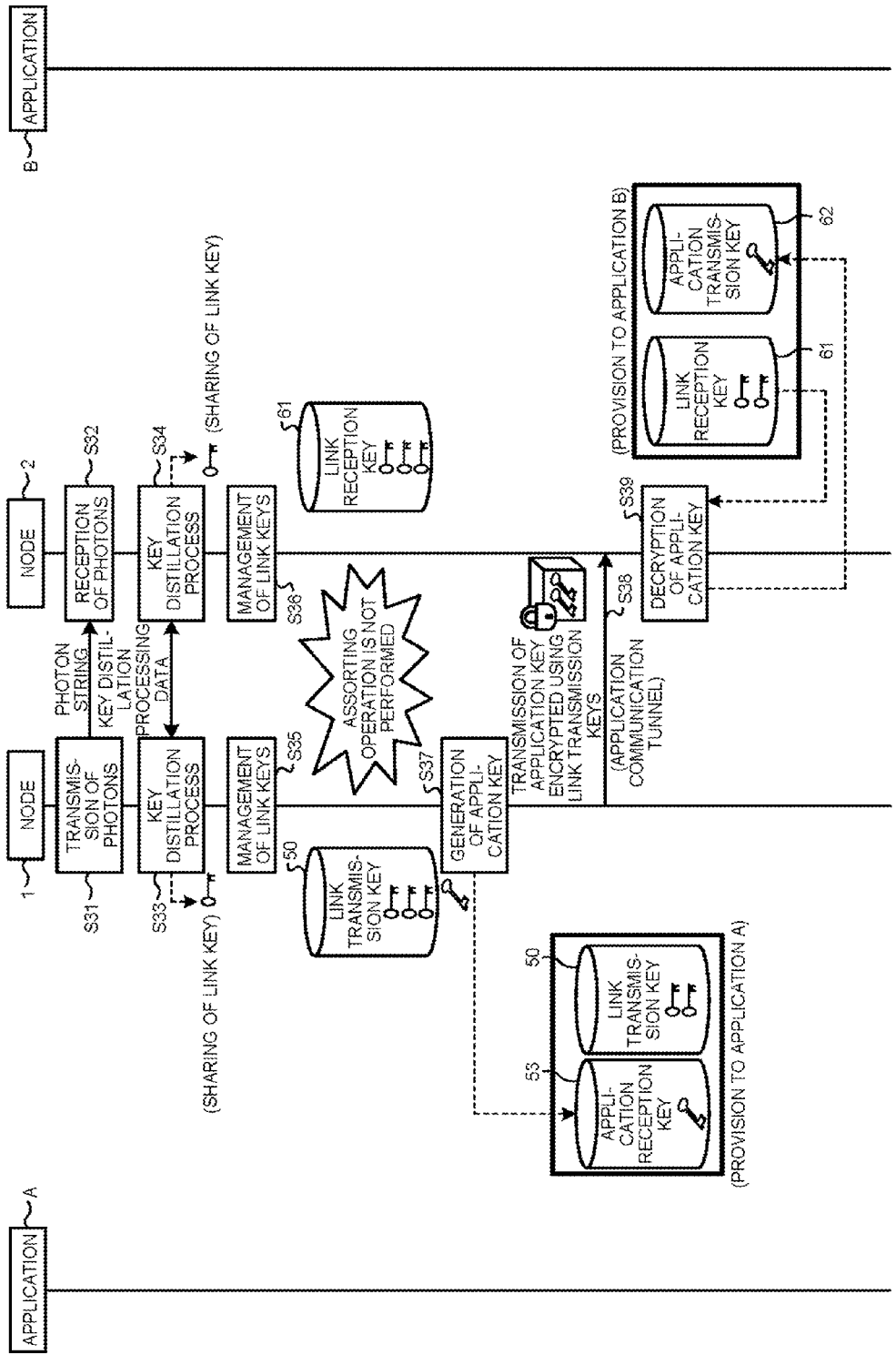
FIG. 10 is a sequence diagram for explaining the application key sharing operation according to a second embodiment.

FIG. 10 is a sequence diagram for explaining the application key sharing operation in the nodes according to the second embodiment. Thus, explained with reference to FIG. 10 is the application key sharing operation according to the second embodiment.

Steps S31 to S36

The operations at Steps S31 to S36 are identical to the link key sharing operation performed at Steps S21 to S26 illustrated in FIG. 8.

Step S37

The application key manager 14 of the node 1 generates an application key, which is a cryptographic key, using random numbers and independent of the link keys generated by the key distillation processor 11. Then, the application key manager 14 stores, in the storage 17, the generated application key only as the application reception key 53 (an example of a first application key) to be used in decrypting the data received by the application A (i.e., only as the application transmission key 62 to be used in encrypting the data to be transmitted by the application B).

Step S38

The application key manager 14 encrypts the generated application key using the link transmission keys 50 assorted as transmission keys according to the link key sharing operation; and sends the encrypted application key to the application key manager 24 of the node 2 via the cryptographic communication tunnel. In this way, the application key generated by the application key manager 14 is sent to the node 2 as one-way communication via the cryptographic communication tunnel. Moreover, the application key manager 14 sends the application key along with the information enabling identification of the application key and the information enabling determination of the role of the application key (for example, information determining that the application key is a transmission key). As a result, it becomes possible to achieve synchronization among the nodes about whether to use the application key as a transmission key or a reception key. Meanwhile, the information enabling identification of the application key and the information enabling determination of the role of the application key can also be encrypted in an identical manner to the encryption of the application key. Alternatively, instead of encrypting the information, only data authentication can be performed.

Step S39

When the encrypted application key is received from the application key manager 14 of the node 1, the application key manager 24 of the node 2 decrypts the application key using the link reception keys 61 assorted as reception keys according to the link key sharing operation. Moreover, according to the information attached to the application key for enabling determination of the role of the application key, the application key manager 24 stores, in the storage 27, the decrypted application key only as the application transmission key 62 (an example of a second application key) to be used in encrypting the data to be transmitted by the application B.

As a result of performing the operations described above, the application key sharing operation according to the second embodiment is performed, and only the application reception key 53 of the node 1 and the application transmission key 62 of the node 2 are shared as the application keys between the nodes 1 and 2.

As a result of performing the operations from Steps S31 to S39, the node 1 has the application reception key 53 representing the application key and has the link transmission keys 50 representing the link keys. Similarly, the node 2 has the application transmission key 62 representing the application key and has the link reception keys 61 representing the link keys. Then, the key provider 15 of the node 1 provides the link transmission keys 50 to be used in encrypting the data to be transmitted by the application A, and provides the application reception key 53 to be used in decrypting the data received by the application A. The key provider 25 of the node 2 provides the application transmission key 62 to be used in encrypting the data to be transmitted by the application B, and provides the link reception keys 61 to be used in decrypting the data received by the application B. Thus, the nodes provide a combination of application keys and link keys to the applications. In that case, when the cryptographic data communication is to be done from the application A of the node 1 to the application B of the node 2, the link keys (the link transmission keys 50) can be used without modification for encryption, thereby enabling elimination of the operations required after the link key sharing operation. That is, in a system in which the cryptographic data communication from the application A to the application B accounts for most of the communication and in which cryptographic data communication from the application B to the application A is a rare event thereby leading to an asymmetric volume of cryptographic data communication, it becomes possible to particularly reduce the processing delay in the operation of sharing cryptographic keys. When it is necessary to perform cryptographic data communication from the application B to the application A that is a rare event, the node 1 can generate the application reception key 53 as the application key (the application transmission key 62 for the node 2) and perform cryptographic transmission of the application reception key 53 to the node 2 via the cryptographic communication tunnel.

Meanwhile, the cryptographic data communication from the application A to the application B as well as the cryptographic data communication from the application B to the application A may or may not be performed according to the one-time pad method. For example, the cryptographic data communication from the application A to the application B can be performed according to the one-time pad method, while the cryptographic data communication from the application B to the application A can be performed according to the AES method.

Moreover, in the example illustrated in FIG. 10, the cryptographic communication tunnel is assumed to be a one-way communication channel used to transmit application keys from the node 1 to the node 2. However, that is not the only possible case. Alternatively, the cryptographic communication tunnel can be a one-way communication channel used to transmit application keys from the node 2 to the node 1. In that case, the link keys generated in the node 1 can be stored as link reception keys, while the link keys generated in the node 2 can be stored as link transmission keys. Consider a case in which the cryptographic communication in one direction is performed according to the one-time pad method and the cryptographic communication in the other direction is performed according to the AES method. In that case, the communication volume does not necessarily match with the required number of cryptographic keys. In that regard, the second embodiment also can be implemented in a case in which the number of cryptographic keys used in the cryptographic communication in one direction and the number of cryptographic keys used in the cryptographic communication in the other direction is disproportionate to each other, and the number of used cryptographic keys is skewed.

Modification Example

Regarding the application key sharing operation according to a modification example, the explanation is given with the focus on the differences with the application key sharing operation explained with reference to FIG. 10. In the second embodiment, the node 1 generates an application key and performs cryptographic transmission to the node 2 of only the application reception key 53 for the node 1 (the application transmission key 62 for the node 2). In the modification example, the explanation is given about the application key sharing operation performed in the nodes 1 and 2 in the case in which a plurality of pairs of applications is running.

Figure 11:
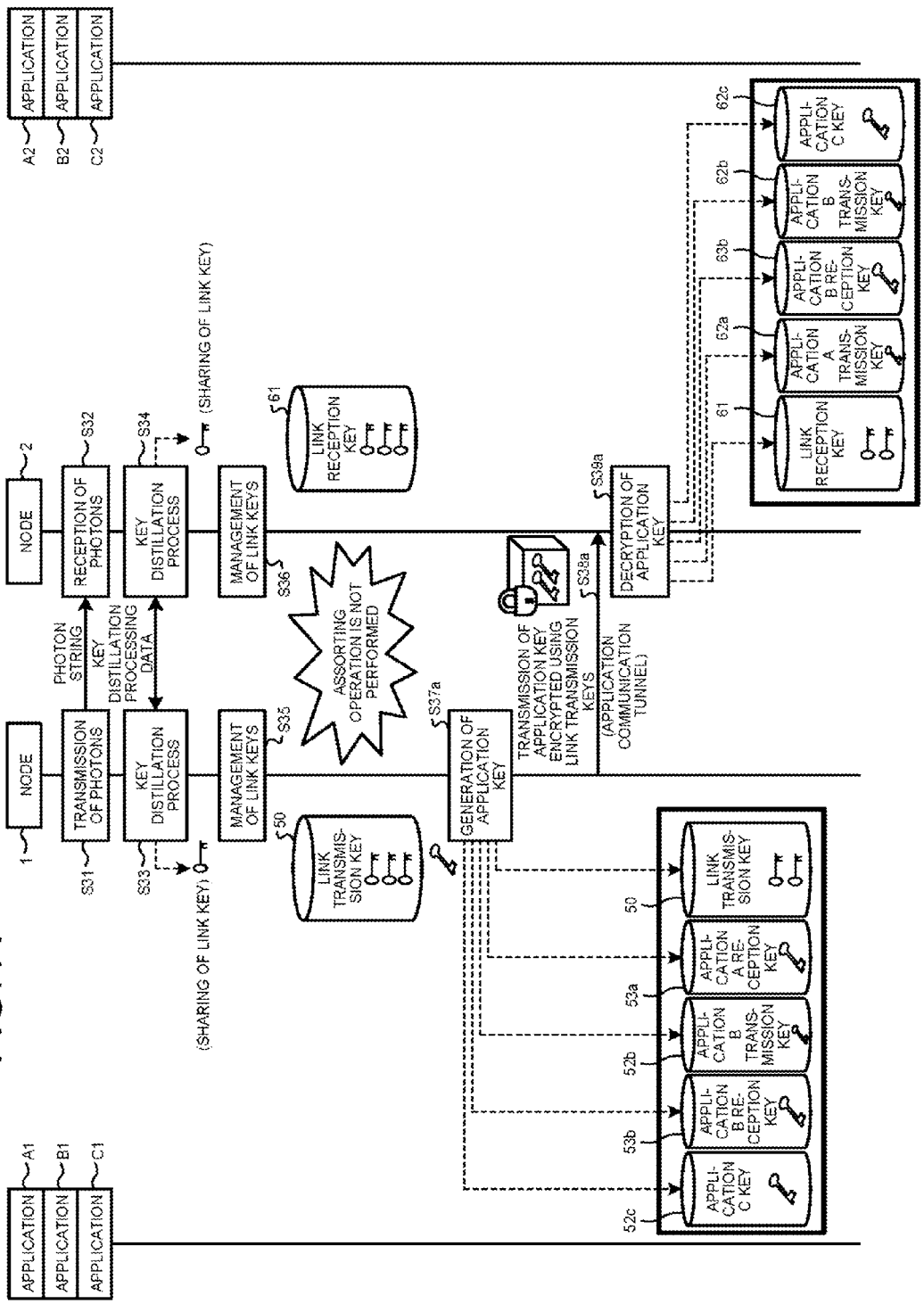
FIG. 11 is a sequence diagram for explaining the application key sharing operation according to a modification example of the second embodiment.

FIG. 11 is a sequence diagram for explaining the application key sharing operation according to the modification example of the second embodiment. Thus, explained with reference to FIG. 11 is the application key sharing operation according to the modification example.

As illustrated in FIG. 11, it is assumed that the applications A1, B1, and C1 are running as the applications connected to or executed in the node 1. Similarly, it is assumed that the applications A2, B2, and C2 are running as the applications connected to or executed in the node 2. These applications perform the operations explained with reference to FIG. 9.

Steps S31 to S36

The operations are identical to the link key sharing operation performed at Steps S31 to S36 illustrated in FIG. 10.

Step S37a

The application key manager 14 of the node 1 generates an application key, which is a cryptographic key, using random numbers and independent of the link keys generated by the key distillation processor 11. Then, the application key manager 14 stores, in the storage 17, the generated application key as follows: the application A reception key 53a (an example of a first application key) to be used in decrypting the data received by the application A1; the application B transmission key 52b (an example of a first application key) to be used in encrypting the data to be transmitted by the application B1; the application B reception key 53b (an example of a first application key) to be used in decrypting the data received by the application B1; and the application C key 52c (an example of a first application key) to be used in encrypting the data to be transmitted by the application C1 and in decrypting the data received by the application C1. Thus, the link transmission keys 50 are provided by the key provider 15 as the cryptographic keys used in encrypting the data transmitted by the application A1.

Step S38a

The application key manager 14 encrypts the generated application key using the link transmission keys 50 assorted as transmission keys according to the link key sharing operation; and sends the encrypted application key to the application key manager 24 of the node 2 via the cryptographic communication tunnel. Moreover, the application key manager 14 sends the application key along with the information enabling identification of the application key and the information enabling determination of the role of the application key (for example, the information about the application in which the application key is to be used or the information enabling distinction of whether the application key is a transmission key or a reception key). As a result, it becomes possible to achieve synchronization among the nodes about the application in which the application key is to be used and about whether to use the application key as a transmission key or a reception key. Meanwhile, the information enabling identification of the application key and the information enabling determination of the role of the application key can also be encrypted in an identical manner to the encryption of the application key. Alternatively, instead of encrypting the information, only data authentication can be performed.

Step S39a

When the encrypted application key is received from the application key manager 14 of the node 1, the application key manager 24 of the node 2 decrypts the application key using the link reception keys 61 assorted as reception keys according to the link key sharing operation. Moreover, according to the information attached to the application key for enabling determination of the role of the application key, the application key manager 24 stores, in the storage 27, the decrypted application key as follows: the application A transmission key 62a (an example of a second application key) to be used in encrypting the data to be transmitted by the application A2; the application B transmission key 62b (an example of a second application key) to be used in encrypting the data to be transmitted by the application B2; the application B reception key 63B (an example of a second application key) to be used in decrypting the data received by the application B2; and the application C key 62c (an example of a second application key) to be used in encrypting the data to be transmitted by the application C2 and in decrypting the data received by the application C2.

As described above, even if a plurality of applications is running among the nodes, the link transmission keys 50 and the link reception keys 61 can be provided to some of the applications (in this example, the applications A1 and A2) and the link keys can be used without modification for encryption, thereby enabling elimination of the processing required after the link key sharing operation. That is, in a system in which the cryptographic data communication from the application A1 to the application A2 accounts for most of the communication and in which cryptographic data communication from the application A2 to the application A1 and cryptographic data communication among other applications are rare events thereby leading to an asymmetric volume of cryptographic data communication, it becomes possible to particularly reduce the processing delay in the operation of sharing cryptographic keys. When it is necessary to perform cryptographic data communication of the rare type, the node 1 can generate the application key for the cryptographic data communication of the corresponding application and perform cryptographic transmission of the application key to the node 2 via the cryptographic communication tunnel.

Meanwhile, depending on the applications, there are times when only one-way communication is performed in the first place. In that case, the application transmission key can be assigned to the application that transmits data, while the application reception key can be assigned to the application that receives data.

Third Embodiment

Regarding the application key sharing operation according to a third embodiment, the explanation is given with the focus on the differences with the application key sharing operation explained with reference to FIG. 8.

In the application key sharing operation described above, as far as the condition for sharing safe cryptographic keys is concerned, it is mandatory that the various types of communication is performed in a correct manner. For example, in the classical communication channel, in case there is a risk of tampering of the communication of the key distillation processing data during the key distillation processs performed by the key distillation processors 11 and 21, or tampering of the communication using the cryptographic communication tunnel (transmission of an application key that is encrypted using a link transmission key), or tampering of the corresponding reception response; it is necessary to be able to detect such tampering. In order to ensure that the communication data is not tampered, generally a technology called message authentication is implemented. In message authentication, the transmission side attaches authentication data, which is obtained by performing calculation based on the communication data and confidential data (an authentication key) known only to the transmission side and the reception side, to the communication data and only then transmits the communication data. Then, the reception side identically calculates the authentication data from the received communication data and confirms that the authentication data matches with the authentication data attached to the received communication data, and thus confirms that the data has not been tampered. In case the communication data is at the risk of being tampered, the message authentication needs to be performed with all communication including the communication of the key distillation processing data and the communication using the cryptographic communication tunnel. From that viewpoint, it is necessary to have a mechanism for sharing the authentication key, which is a cryptographic key used in message authentication, between the nodes 1 and 2.

Figure 12:
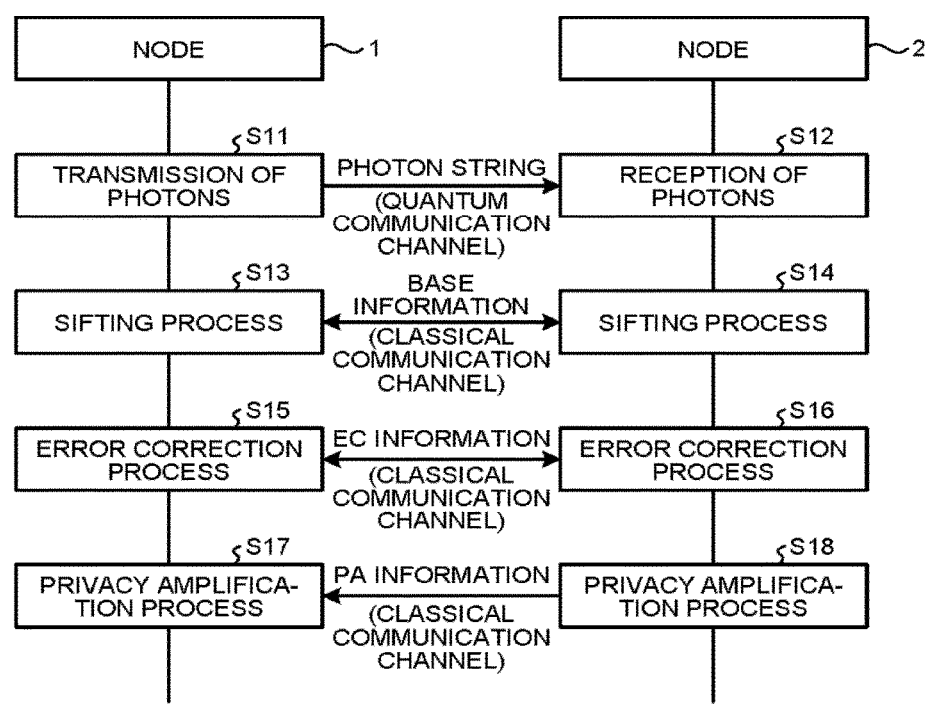
FIG. 12 is a sequence diagram illustrating an example of a link key generation operation in the nodes.

FIG. 12 is a sequence diagram illustrating an example of a link key generation operation in the nodes. Thus, explained with reference to FIG. 12 is a flow of operations during a link key generation operation that includes a communication key distillation process for communicating the key distillation processing data.

Step S11

For example, the quantum key sharer 10 transmits, to the quantum key sharer 20 of the node 2 via the quantum communication channel, a photon string that is made of single photons, which are generated to be in a polarization state based on base information generated using a randomly-selected base, based on a photon bit string that represents bit information generated using random numbers. Then, the quantum key sharer 10 sends the generated base information and the photon bit string to the key distillation processor 11.

Step S12

The quantum key sharer 20 receives the photon string from the quantum key sharer 10 of the node 1 via the quantum communication channel, and obtains a photon bit string representing bit information by reading the received photon string based on base information that is generated using a randomly-selected base. Then, the quantum key sharer 20 sends the generated base information and the photon bit string to the key distillation processor 21.

Step S13

The key distillation processor 11 receives the base information, which is generated by the quantum key sharer 20 of the node 2, from the key distillation processor 21 of the node 2 via the classical communication channel; and performs a sifting process that includes comparing the received base information with the base information generated by the quantum key sharer 10, extracting the bits corresponding to the matching portion from the photon bit string, and generating a shared bit string.

Step S14

The key distillation processor 21 receives the base information, which is generated by the quantum key sharer 10 of the node 1, from the key distillation processor 11 of the node 1 via the classical communication channel; and performs a sifting process that includes comparing the received base information with the base information generated by the quantum key sharer 20, extracting the bits corresponding to the matching portion from the photon bit string, and generating a shared bit string.

Step S15

The key distillation processor 11 performs an error correction process that includes exchanging control data (error correction (EC) information) with the key distillation processor 21 of the node 2 via the classical data communication channel; correcting the bit errors in the shared bit string; and generating a post-correction bit string.

Step S16

The key distillation processor 21 performs an error correction process that includes exchanging control data (error correction (EC) information) with the key distillation processor 11 of the node 1 via the classical data communication channel; correcting the bit errors in the shared bit string; and generating a post-correction bit string.

Step S17

The key distillation processor 11 receives control data (privacy amplification (PA) information) from the key distillation processor 21 of the node 2 via the classical communication channel; and performs a key compression operation (a privacy amplification process) with respect to the post-correction bit string with the aim of cancelling out, from the number of errors corrected in the error correction process, the bits that are likely to have been tapped by a wiretapper, and generates a link key.

Step S18

The key distillation processor 21 generates control data (PA information) and sends it to the key distillation processor 11 of the node 1 via the classical communication channel; and performs a key compression operation (a privacy amplification process) with respect to the post-correction bit string with the aim of cancelling out, from the volume of data communicated in a classical manner during the error correction process, the volume of information that is likely to have been tapped by a wiretapper, and generates a link key.

As a result of performing the operations described above, identical link keys are generated in the nodes 1 and 2. Herein, the link keys generated as a result of performing the operation described above are what are called one-time pad keys that are used only once. Hence, if the operations described above are performed in a repeated manner, different link keys are generated in a repeated manner.

Figure 13:
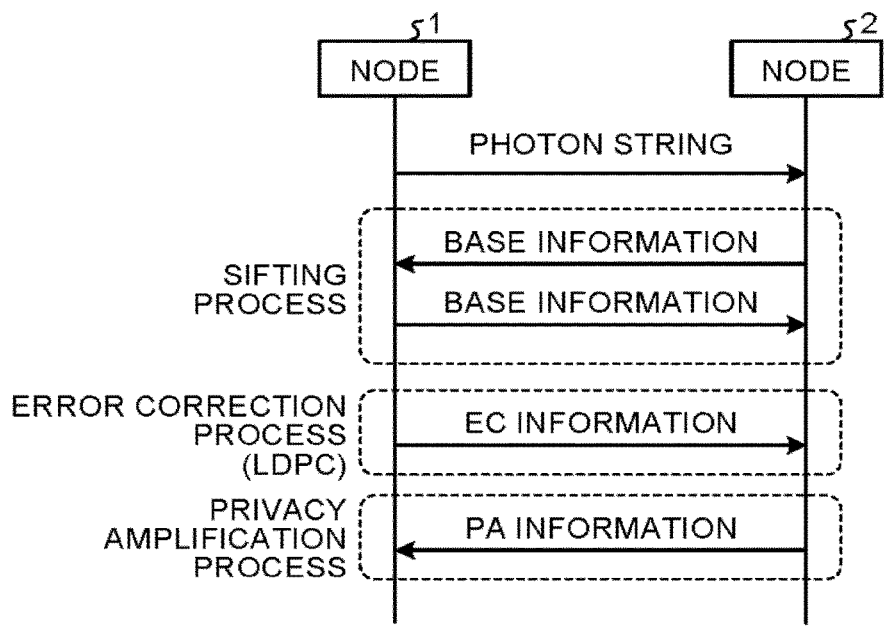
FIG. 13 is a diagram illustrating an example of control data used in a key distillation process.

FIG. 13 is a diagram illustrating an example of the control data used in the key distillation process. Thus, explained with reference to FIG. 13 is an example of the control data used in the key distillation process, that is, an example of the key distillation processing data (control information) to be subjected to message authentication.

In the sifting process during the key distillation process explained with reference to FIG. 12, the key distillation processors 11 and 21 mutually communicate base information via the classical communication channel as illustrated in FIG. 13 with the aim of generating a shared bit string from a photon bit string. Herein, the base information is an example of the key distillation processing data.

In the error correction process during the key distillation process, it is assumed that the LDPC algorithm (LDPC stands for Low Density Parity Check) is implemented as illustrated in FIG. 13. In that case, the key distillation processor 11 of the node 1 calculates syndrome information of the shared bit string that is generated, and sends the syndrome information as the EC information to the key distillation processor 21 of the node 2 via the classical communication channel. Upon receiving the syndrome information, the key distillation processor 21 repeatedly performs calculations based on the syndrome information and the shared bit string generated therein, and eventually creates exactly same bit information as the shared bit string generated by the key distillation processor 11. As a result, identical post-correction bit strings can be shared between the nodes 1 and 2. In the error correction process, the syndrome information that represents the EC information and that is sent from the key distillation processor 11 to the key distillation processor 21 is an example of the key distillation processing data.

In the privacy amplification process during the key distillation process, the key distillation processors 11 and 21 make use of, for example, matrix data for the purpose of performing compression with respect to the post-correction bit string with the aim of cancelling out, from the volume of data communicated in a classical manner during the error correction process, the volume of information that is likely to have been tapped by a wiretapper. The matrix data may be shared in advance between the nodes 1 and 2. Alternatively, the key distillation processor 11 of the node 1 can generate the matrix data and send it as the PA information to the key distillation processor 21 of the node 2 via the classical communication channel as illustrated in FIG. 13. In the privacy amplification process, the matrix data that represents the PA information and that is sent from the key distillation processor 11 to the key distillation processor 21 is an example of the key distillation processing data.

Figure 14:
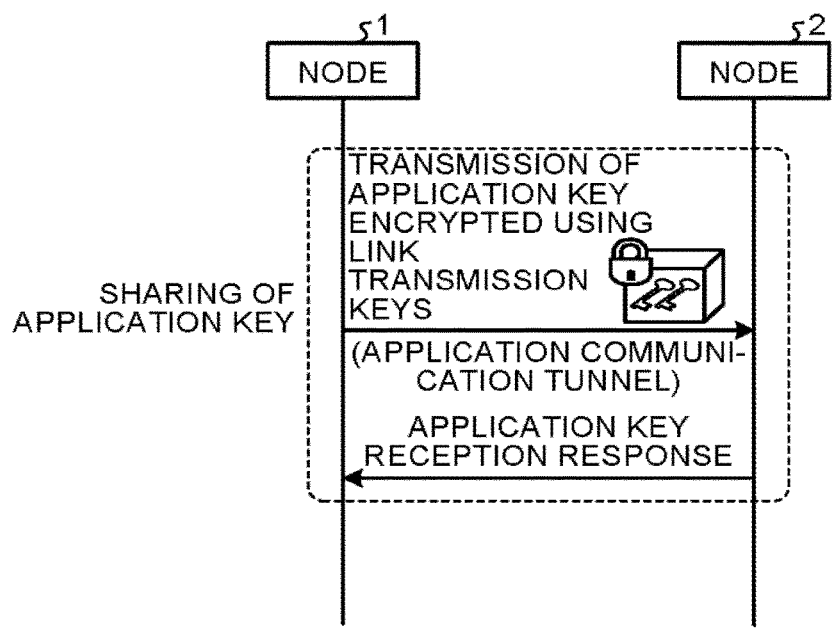
FIG. 14 is a diagram illustrating transmission of an encrypted application key and a response thereto.

FIG. 14 is a diagram illustrating transmission of an encrypted application key and a response thereto. Thus, explained with reference to FIG. 14 is the target communication for message authentication done using the cryptographic communication tunnel and a reception response with respect to the communication and to be subjected to message authentication.

As explained earlier with reference to FIG. 8, the application key manager 14 of the node 1 encrypts an application key, which is a cryptographic key generated using random numbers, using link transmission keys and sends the encrypted application key to the application key manager 14 of the node 2 via the cryptographic communication tunnel in the classical communication channel. As a result, the application key is shared between the nodes 1 and 2. Herein, the application key that is sent via the cryptographic communication tunnel is attached with the information enabling identification of the application key and the information enabling determination of the role of the application key. The transmission via the cryptographic communication tunnel is a one-way communication from the node 1 to the node 2. However, as an option, as illustrated in FIG. 14, an application key reception response indicating that the cryptographic key is received or indicating that reception of the cryptographic key was not successful can be sent to the node 1 via the classical communication channel. In this way, the communication using the cryptographic communication tunnel (i.e., transmission of the application key that is encrypted using link transmission keys) and the application key reception response, which is the response with respect to the communication, becomes the target of message authentication. Moreover, the application key as well as the information enabling identification of the application key and the information enabling determination of the role of the application key, which is sent along with the application key, can also be the target for message authentication.

Figure 15:
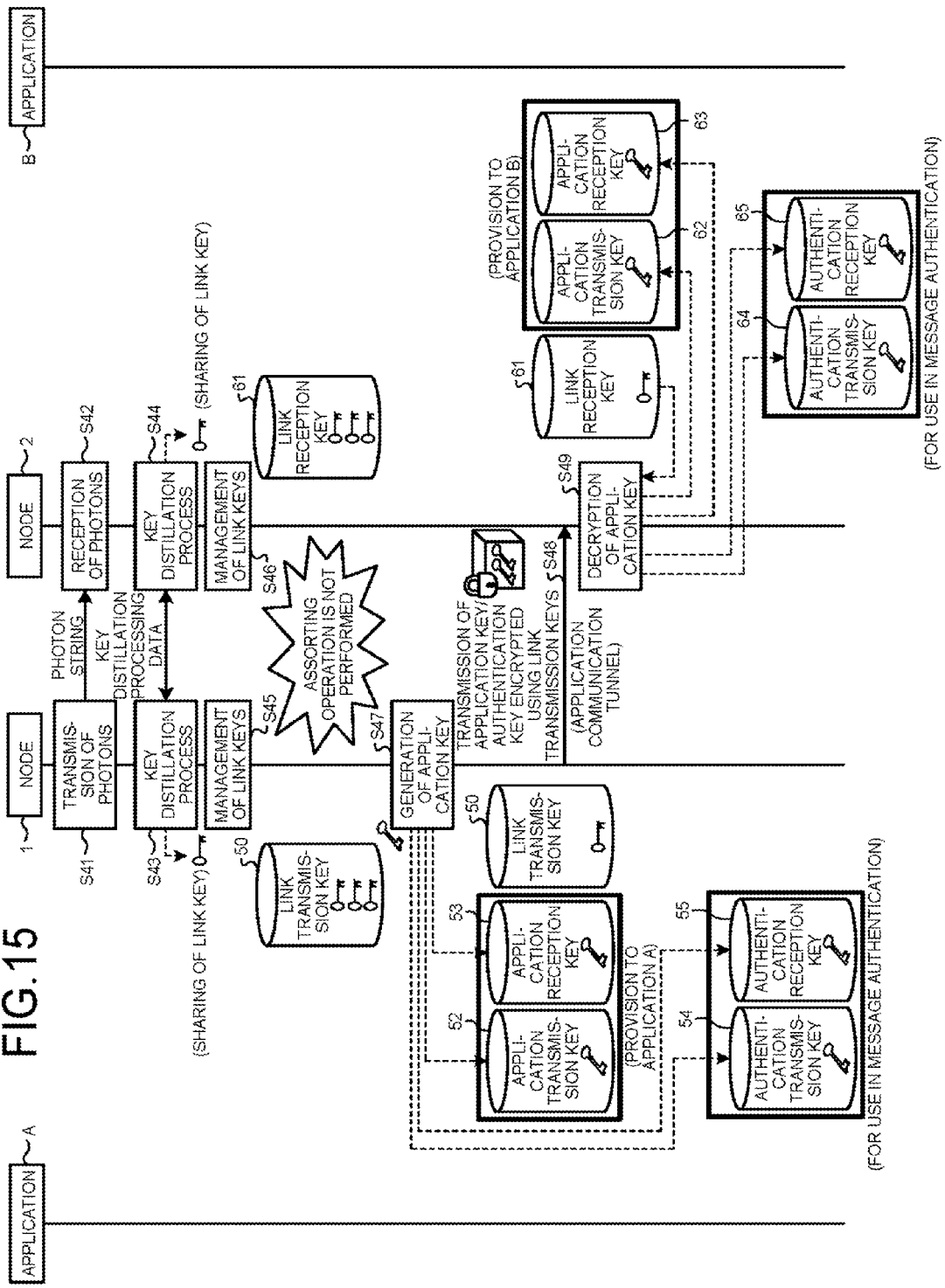
FIG. 15 is a sequence diagram for explaining an example of the application key sharing operation according to a third embodiment.

FIG. 15 is a sequence diagram for explaining an example of the application key sharing operation in the nodes according to the third embodiment. Thus, explained with reference to FIG. 15 is the application key sharing operation according to the third embodiment in which an application key as well as an authentication key, which is a cryptographic key used in message authentication, is shared. In the example illustrated in FIG. 15, the explanation is given for a case in which a single type of authentication key is generated for each direction of communication between the nodes 1 and 2.

Steps S41 to S46

The operations at Steps S41 to S46 according to the third embodiment are identical to the link key sharing operation performed at Steps S21 to S26 illustrated in FIG. 8.

Step S47

The application key manager 14 of the node 1 generates an application key, which is a cryptographic key, using random numbers and independent of the link keys generated by the key distillation processor 11. Moreover, the application key manager 14 generates an authentication key, which is a cryptographic key to be used in message authentication, using random numbers. Then, the application key manager 14 stores, in the storage 17, the generated application key as the application transmission key 52 (an example of a first application key) to be used in encrypting the data to be transmitted by the application A and as the application reception key 53 (an example of a first application key) to be used in decrypting the data received by the application A. Moreover, the application key manager 14 stores, in the storage 17, the generated authentication key as an authentication transmission key 54 (an example of a first authentication key) to be used in calculating authentication data for the data transmitted by the node 1 to the node 2 and as an authentication reception key 55 (an example of a first authentication key) to be used in calculating authentication data for the data received by the node 1 from the node 2.

Step S48

The application key manager 14 encrypts the generated application key and the generated authentication key using the link transmission keys 50 assorted as transmission keys according to the link key sharing operation; and sends the encrypted application key and the encrypted authentication key to the application key manager 24 of the node 2 via the cryptographic communication tunnel. In this way, the application key and the authentication key generated by the application key manager 14 are sent to the node 2 using one-way communication via the cryptographic communication tunnel. Moreover, along with the application key and the authentication key, the application key manager 14 sends the information enabling identification of the application key and the authentication key and the information enabling determination of the role of the application key and the authentication key (for example, the information enabling distinction of whether the application key and the authentication key are transmission keys or reception keys). As a result, it becomes possible to achieve synchronization among the nodes about whether to use the application key and the authentication key as transmission keys or reception keys.

Step S49

When the encrypted application key and the encrypted authentication key are received from the application key manager 14 of the node 1, the application key manager 24 of the node 2 decrypts the application key and the authentication key using the link reception keys 61 assorted as reception keys according to the link key sharing operation. Moreover, according to the information attached to the application key for enabling determination of the role of the application key, the application key manager 24 stores, in the storage 27, the decrypted application key as the application transmission key 62 (an example of a second application key) to be used in encrypting the data to be transmitted by the application B and as the application reception key 63 (an example of a second application key) to be used in decrypting the data received by the application B. Moreover, according to the information attached to the authentication key for enabling determination of the role of the authentication key, the application key manager 24 stores, in the storage 27, the generated authentication key as an authentication transmission key 64 (an example of a second authentication key) to be used in calculating authentication data for the data transmitted by the node 2 to the node 1 and as an authentication reception key 65 (an example of a second authentication key) to be used in calculating authentication data for the data received by the node 2 from the node 1.

As a result of performing the operations described above, the application key sharing operation according to the third embodiment is performed, and the application key and the authentication key are shared between the nodes 1 and 2.

Then, in the case of transmitting data from the node 1 to the node 2, in order to enable calculation of the authentication data, the key provider 15 of the node 1 provides the authentication transmission key 54 to the data transmission destination. Moreover, when data is received by the node 1 from the node 2, in order to enable calculation of the authentication data, the key provider 15 of the node 1 provides the authentication reception key 55 to the data reception destination. For example, when the key distillation processor 11 (an example of a first data communicating function) transmits the key distillation processing data to the key distillation processor 21 via the classical communication channel, the key provider 15 provides the authentication transmission key 54 for the purpose of message authentication. Moreover, when the key distillation processor 11 (an example of a first data communicating function) receives the key distillation processing data from the key distillation processor 21 via the classical communication channel, the key provider 15 provides the authentication reception key 55 for the purpose of authentication data calculation. Furthermore, when the application key manager 14 (an example of a first data communication function) sends an application key, which is encrypted using the link transmission keys 50, to the application key manager 24 via the cryptographic communication tunnel, the key provider 15 provides the authentication transmission key 54 for the purpose of message authentication. Moreover, when the application key manager 14 (an example of a first data communicating function) receives an application key reception response from the application key manager 24 via the classical communication channel, the key provider 15 provides the authentication reception key 55 for the purpose of authentication data calculation.

Meanwhile, in the case of data transmission from the node 2 to the node 1, in order to enable authentication data calculation, the key provider 25 of the node 2 provides the authentication transmission key 64 to the data transmission destination. Moreover, when data is received from the node 2 to the node 1, in order to enable authentication data calculation, the key provider 25 of the node 2 provides the authentication reception key 65 to the data reception destination. For example, when the key distillation processor 21 (an example of a second data communicating function) transmits the key distillation processing data to the key distillation processor 11 via the classical communication channel, the key provider 25 provides the authentication transmission key 64 for the purpose of message authentication. Moreover, when the key distillation processor 21 (an example of a second data communicating function) receives the key distillation processing data from the key distillation processor 11 via the classical communication channel, the key provider 25 provides the authentication reception key 65 for the purpose of authentication data calculation. Furthermore, when the application key manager 24 (an example of a second data communication function) receives an application key, which is encrypted using the link transmission keys 50, from the application key manager 14 via the cryptographic communication tunnel, the key provider 25 provides the authentication reception key 65 for the purpose of authentication data calculation. Moreover, when the application key manager 24 (an example of a second data communicating function) sends an application key reception response to the application key manager 14 via the classical communication channel, the key provider 25 provides the authentication transmission key 64 for the purpose of message authentication.

In this way, an application key as well as an authentication key used in message authentication is shared between the nodes 1 and 2. In the case of performing data communication via the classical communication channel, the authentication key is provided to the data transmission destination or the data reception destination. As a result, it becomes possible to confirm whether or not the communication data in the classical communication channel has not been tampered.

Meanwhile, in the explanation given with reference to FIG. 15, a single type of authentication key is generated for each direction of communication between the nodes 1 and 2. However, that is not the only possible case. Alternatively, a single authentication key can be used regardless of the direction of communication. In that case, only a single type of authentication key is shared between the nodes 1 and 2.

Moreover, in the explanation given with reference to FIG. 15, a single type of authentication key is generated for each direction of communication between the nodes 1 and 2. However, that is not the only possible case. Alternatively, a different authentication key can be generated for each set of communication data. For example, a different authentication key can be generated for each set of data such as the key distillation processing data, the communication using the cryptographic communication tunnel, and the application key reception response. In addition, a different authentication key can be generated for each set of data, such as the control data during the sifting process, the control data (the EC information) during the error correction process, and the control data (the PA information) during the privacy amplification process, in the key distillation processing data. As far as the communication using the cryptographic communication tunnel is concerned, instead of implementing the simple one-time pad method as the method for establishing the cryptographic communication tunnel between the nodes 1 and 2, it is possible to establish a cryptographic communication tunnel in which message authentication is also performed in advance. In that case, as far as the authentication key for the cryptographic communication tunnel is concerned, a separate authentication key need not be sent from the node 1 to the node 2 and shared therebetween.

Meanwhile, when a plurality of applications is running in the nodes 1 and 2, a different authentication key can be generated for each application. However, when application transmission keys and application reception keys are assigned to the applications, if the setting is done in such a way that, instead of implementing the simple one-time pad method, cryptographic data communication is performed in which message authentication is also performed in advance; then a separate authentication key need not be assigned to each application.

As described above, if a different authentication key is generated for each set of communication data or if a different authentication key is generated for each of a plurality of applications, in the case in which processes requiring an authentication key are performed in parallel, the updating timing of each authentication key can be set on an individual basis. In order to perform message authentication in a safe manner, it is necessary to appropriately update the authentication keys. Generally, the updating timing of an authentication key is determined according to the volume of communication data and the elapsed time. In each of the processes that are performed in parallel, the authentication key can be updated at appropriate timings irrespective of the communication timings of the other processes and the volume of communication data in the other processes. As a result, not only the application key sharing operation can be performed at a high speed, but the development man-hour can also be reduced because each process can be independently developed.

Meanwhile, the operation of sharing an authentication key for the purpose of message authentication as described in the third embodiment can obviously be implemented in the second embodiment too.

Modification Example

In the application key sharing operation explained with reference to FIG. 15, before sharing an application key among the nodes, an authentication key is required in the first place for the purpose of performing message authentication with respect to the key distillation processing data that is necessary in sharing the link keys. In a modification example, the explanation is given for a method of dealing with that situation.

As is clear from the application key sharing operation explained with reference to FIG. 15, before the key distillation processing data to be used in generating the initial link key is communicated, it is not possible to share an authentication key between the nodes 1 and 2 via the cryptographic communication tunnel. In order to deal with such a situation, the nodes 1 and 2 store, in the storages 17 and 27, respectively (an example of a third storage and a fourth storage, respectively), initial keys (a first initial key and a second initial key) representing authentication keys that are to be used in performing message authentication in a safe manner at the time of system booting and that are different than the cryptographic keys shared during the application key sharing operation explained with reference to FIG. 15. As such initial keys, the following types of keys can be stored in advance in the storages 17 and 27: authentication keys to be used in message authentication of the key distillation processing data; authentication keys to be used in message authentication of the communication performed using the cryptographic communication tunnel; and authentication keys to be used in message authentication of the application key reception responses. After the system is booted, when sharing of link keys, application keys, and authentication keys starts between the nodes 1 and 2, the initial keys complete their role and are then substituted by the authentication keys shared during the application key sharing operation. Meanwhile, the initial keys can be stored in the storages 17 and 27 in which link keys and application keys are also stored, or can be stored in separate storages dedicated for initial keys (an example of the third storage and the fourth storage).

In this way, if initial keys of the authentication keys are stored in advance, after the system is booted, message authentication of each set of communication data becomes possible even before application keys and authentication keys are shared among the nodes.

Fourth Embodiment

Regarding the application key sharing operation according to a fourth embodiment, the explanation is given with the focus on the differences with the application key sharing operation according to third embodiment. In the fourth embodiment, the explanation is given for an operation in which, according to a dynamically-changing algorithm of the key distillation process, changes are done to the information enabling determination of the role of an authentication key as attached at the time of sending the authentication key.

Figure 16:
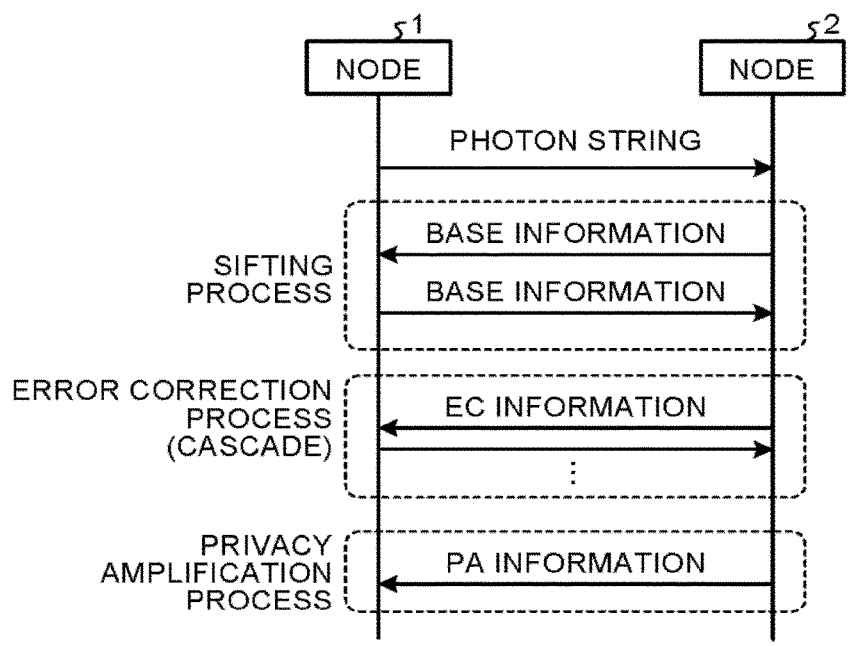
FIG. 16 is a diagram illustrating an example of the changes in the control data according to a fourth embodiment.

FIG. 16 is a diagram illustrating an example of the changes in the control data according to the fourth embodiment.

The details of the key distillation process (i.e., the sifting process, the error correction process, and the privacy amplification process) explained with reference to FIG. 12 are only exemplary, and the key distillation process can alternatively be performed according to other methods. For example, with reference to FIG. 13, the explanation is given for a case in which the LDPC algorithm is implemented as the algorithm for the error correction process. Alternatively, as illustrated in FIG. 16, it is possible to implement an algorithm called cascade. Unlike the LDPC algorithm, in the cascade algorithm, the control data (EC information) is communicated for a number of times between the nodes 1 and 2. As a result of implementing the cascade algorithm for the error correction process, it is likely that the error correction process can be performed at a high speed by performing parallel operations using a plurality of threads.

Meanwhile, with reference to FIG. 13, in the privacy amplification process, although the matrix data representing the PA information is sent from the node 1 to the node 2, the matrix data can alternatively be sent from the node 2 to the node 1.

In this way, in order to share the link key at a high speed by performing the link key sharing operation that includes the key distillation process, it is likely that the algorithm for the key distillation process needs to be dynamically changed according to the variable parameters such as the error rate of the photon string and the number of arrived photons that keep on changing. As a result of changing the algorithm for the key distillation process, the communication direction (i.e., the required types of authentication keys) may change or the number of required types of authentication keys may change because of a change in the number of threads that execute the algorithm. In that regard, in the fourth embodiment, at the time of encoding the generated application key and the generated authentication key and sending them to the node 2 via the cryptographic communication tunnel, the node 1 attaches the information that enables determination of the role of the authentication key and that corresponds to the changed algorithm for the key distillation process.

As a result of performing the operations described above, the role of the authentication key that is shared among the nodes can be changed according to the dynamically-changing algorithm for the key distillation process. Hence, even if the algorithm changes in a dynamic manner, message authentication can be performed in an appropriate manner.

Meanwhile, the computer programs executed in the nodes (the quantum key distribution devices) according to the embodiments and the modification examples described above can be stored in advance in, for example, the ROM 81.

Alternatively, the computer programs executed in the nodes according to the embodiments and the modification examples described above can be recorded as installable or executable files in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer programs executed in the nodes according to the embodiments and the modification examples described above can be saved as downloadable files on a computer connected to the Internet or can be made available for distribution through a network such as the Internet.

Meanwhile, the computer programs executed in the nodes according to the embodiments and the modification examples described above can make a computer function as the functional units of a node. In such a computer, the CPU 80 can read the computer programs from a computer-readable storage medium, load them in a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key distribution device that is connected to another quantum key distribution device by a quantum communication channel and a classical communication channel and that shares a cryptographic key with the another quantum key distribution device, the quantum key distribution device comprising:
    a quantum key sharer configured to share a photon string with the another quantum key distribution device using quantum key distribution via the quantum distribution channel, and obtain a photon bit string corresponding to the photon string;
    a key distillation processor configured to generate a link key as the cryptographic key from the photon bit string by a key distillation process;
    a first manager configured to store the link key as a link transmission key to be used in data encryption in an internal or external storage;
    a second manager configured to
        store, in the storage, a first application key that has a predetermined role decided therefor from an application key that is the cryptographic key to be used in cryptographic data communication,
        encrypt a second application key that has a role corresponding to the first application key decided therefor from the application key, using the link transmission key, and
        send the encrypted second application key to the another quantum key distribution device via the classical communication channel; and
    a key manager configured to manage the first application key that is stored in the storage for use in encryption or decryption when an application performs data communication.

2. A quantum key distribution device that is connected to another quantum key distribution device by a quantum communication channel and a classical communication channel and that shares a cryptographic key with the another quantum key distribution device, the quantum key distribution device comprising:
    a quantum key sharer configured to share a photon string with the another quantum key distribution device using quantum key distribution via the quantum distribution channel, and that obtain a photon bit string corresponding to the photon string;
    a key distillation processor configured to generate a link key as the cryptographic key from the photon bit string by a key distillation process;
    a first manager configured to store the link key as a link reception key to be used in data decryption in an internal or external storage;
    a second manager configured to
        receive an application key that is the cryptographic key to be used in cryptographic data communication and has a predetermined role decided therefor, from the another quantum key distribution device via the classical communication channel,
        decrypt the received application key using the link reception key, and
        store the decrypted application key in the storage; and
    a key manager configured to manage the application key that is stored in the storage for use in encryption or decryption when an application performs data communication.

3. A quantum key distribution system comprising a first quantum key distribution device and a second quantum key distribution device that are connected by a quantum communication channel and a classical communication channel, a cryptographic key being shared among the first quantum key distribution device and the second quantum key distribution device, wherein
    the first quantum key distribution device includes
        a first quantum key sharer configured to share a photon string with the second quantum key distribution device using quantum key distribution via the quantum distribution channel, and obtain a photon bit string corresponding to the photon string from the second quantum key distribution device using quantum key distribution via the quantum distribution channel,
        a first key distillation processor configured to generate a link key as the cryptographic key from the photon bit string by a key distillation process,
        a first link-key manager configured to store the link key as a link transmission key to be used in data encryption in an internal or external first storage,
        a first application-key manager configured to
            store, in the first storage, a first application key that has a predetermined role decided therefor from an application key that is the cryptographic key to be used in cryptographic data communication, encrypt a second application key that has a role corresponding to the first application key decided therefor from the application key, using the link transmission key, and send the encrypted second application key to the second quantum key distribution device via the classical communication channel, and a first key manager configured to manage the first application key that is stored in the first storage for use in encryption or decryption when an application performs data communication, and the second quantum key distribution device includes a second quantum-key sharer configured to share the photon string with the first quantum key distribution device using quantum key distribution via the quantum distribution channel, and obtain a photon bit string corresponding to the photon string from the first quantum key distribution device using quantum key distribution via the quantum distribution channel, a second key distillation processor configured to generate a link key as the cryptographic key from the photon bit string by a key distillation process, a second link-key manager configured to store the link key as a link reception key to be used in data decryption in an internal or external second storage, a second application-key manager configured to decrypt the second application key that is received from the first application-key manager via the classical communication channel, using the link reception key, and store the decrypted second application key in the second storage, and a second key manager configured to manage the second application key that is stored in the second storage for use in encryption or decryption when an application performs data communication.

4. The system according to claim 3, wherein the first key manager manages the link transmission key that is stored in the first storage for use in encryption when an application performs data communication, and the second key manager manages the link reception key that is stored in the second storage for use in decryption when an application performs data communication.

5. The system according to claim 3, wherein the first application-key manager stores, in the first storage, a first authentication key as an authentication key to be used in data authentication that has a predetermined role decided therefor, and encrypts a second authentication key that is the authentication key having a role corresponding to the first authentication key decided therefor, using the link transmission key, and send the encrypted authentication key to the second quantum key distribution device via the classical communication channel, the first key manager provides the first authentication key that is stored in the first storage to the first data communication function to generate authentication data based on communication data to be subjected to data authentication when a first data communication function communicates the communication data, the second application-key manager decrypts the second authentication key that is received from the first application-key manager via the classical communication channel, using the link reception key, and stores the decrypted second authentication key in the second storage, and the second key manager provides the second authentication key that is stored in the second storage to the second data communication function to generate authentication data based on communication data to be subjected to data authentication when a second data communication function communicates the communication data.

6. The system according to claim 5, wherein the first application manager operates as the first data communication function, generates authentication data from the second application key that is encrypted using the link transmission key and that is to be subjected to data authentication, using the first authentication key provided by the first key manager, attaches the authentication data to the encrypted second application key, and sends the second application key to the second quantum key distribution device via the classical communication channel, and the second application manager operates as the second data communication function, and generates authentication data from the encrypted second application key that is received from the first application-key manager via the classical communication channel, using the second authentication key provided by the second key manager.

7. The system according to claim 5, wherein the first key distillation processor operates as the first data communication function, and generates authentication data from control information to be subjected to data authentication, using the first authentication key provided by the first key manager when the control information is received and transmitted from and to the second key distillation processor via the classical communication channel in a key distillation process, the second key distillation processor operates as the second data communication function, and generates authentication data from the control information using the second authentication key provided by the second key manager when the control information is received and transmitted from and to the first key distillation processor via the classical communication channel in a key distillation process.

8. The system according to claim 7, wherein the first application-key manager stores, when an algorithm for a key distillation process performed by the first key distillation processor and the second distillation processor is changed, the first authentication key that is the authentication key having a predetermined role corresponding to the changed algorithm decided therefor, in the first storage.

9. The system according to claim 5, wherein the first key manager provides the first authentication key that is stored in the first storage to an application serving as the first data communication function to generate authentication data based on the communication data when the application communicates communication data to be subjected to data authentication, and the second key manager provides the second authentication key that is stored in the second storage to an application serving as the second data communication function to generate authentication data based on the communication data when the application communicates communication data to be subjected to data authentication.

10. The system according to claim 5, wherein
the first quantum key distribution device further includes a third storage configured to store a first initial key that, before the first authentication key is stored in the first storage by the first application-key manager, is used in place of the first authentication key in a case in which authentication data is generated by the first data communication function, and
the second quantum key distribution device further includes a fourth storage configured to store a second initial key that, before the second authentication key is stored in the second storage by the second application-key manager, is used in place of the second authentication key in a case in which authentication data is generated by the second data communication function.

11. A quantum key communication method implemented in a quantum key communication system that includes a first quantum key distribution device and a second quantum key distribution device which are connected by a quantum communication channel and a classical communication channel and which share a cryptographic key, the method comprising:
  obtaining a photon bit string corresponding to a photon string using quantum key distribution via the quantum distribution channel, the photon string being shared among the first quantum key distribution device and the second quantum key distribution device;
  generating a link key as the cryptographic key from the photon bit string by a key distillation process;
  storing the link key as a link transmission key to be used in data encryption in an internal or external first storage;
  storing, in the first storage, a first application key that has a predetermined role decided therefor from an application key that is the cryptographic key to be used in cryptographic data communication;
  encrypting a second application key that has a role corresponding to the first application key decided therefor from the application key, using the link transmission key;
  sending the encrypted second application key to the second quantum key distribution device via the classical communication channel;
  managing the first application key that is stored in the first storage for use in encryption or decryption when an application performs data communication;
  obtaining a photon bit string corresponding to the photon string using quantum key distribution via the quantum distribution channel;
  generating a link key as the cryptographic key from the photon bit string by a key distillation process;
  storing the link key as a link reception key to be used in data decryption in an internal or external second storage;
  decrypting the second application key that is received from the first quantum key distribution device via the classical communication channel, using the link reception key;
  storing the decrypted second application key in the second storage; and
  managing the second application key that is stored in the second storage for use in encryption or decryption when an application performs data communication.

* * * * *